(12) United States Patent
Frink et al.

(10) Patent No.: US 9,565,397 B2
(45) Date of Patent: Feb. 7, 2017

(54) DETERMINISTICALLY SKEWING TRANSMISSION OF CONTENT STREAMS

(75) Inventors: Craig Frink, Chelmsford, MA (US); Michael G. Hluchyj, Wellesley, MA (US); Santosh Krishnan, Windham, NH (US); Christopher Lawler, Wellesley, MA (US); Daniel Pond, Andover, MA (US); Robert Ryan, Marlboro, MA (US); Qin-Fan Zhu, Acton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 902 days.

(21) Appl. No.: 12/393,900

(22) Filed: Feb. 26, 2009

(65) Prior Publication Data

US 2010/0218231 A1    Aug. 26, 2010

(51) Int. Cl.
| | |
|---|---|
| *H04N 21/222* | (2011.01) |
| *H04N 21/242* | (2011.01) |
| *H04N 21/262* | (2011.01) |
| *H04N 21/44* | (2011.01) |
| *H04N 21/2343* | (2011.01) |

(Continued)

(52) U.S. Cl.
CPC ........ *H04N 7/17318* (2013.01); *H04N 21/222* (2013.01); *H04N 21/2393* (2013.01); *H04N 21/23439* (2013.01); *H04N 21/242* (2013.01); *H04N 21/2625* (2013.01); *H04N 21/4384* (2013.01); *H04N 21/44004* (2013.01);

(Continued)

(58) Field of Classification Search
CPC ............ H04N 21/2625; H04N 21/4404; H04N 21/23439; H04N 21/44004; H04N 21/2393; H04N 21/4384

USPC .......... 725/86–103, 117, 105, 114–116, 135, 725/138, 143–146; 370/229–231, 235, 370/351, 390

See application file for complete search history.

(56) References Cited

U.S. PATENT DOCUMENTS

| | | |
|---|---|---|
| 5,424,770 A | 6/1995 | Schmelzer et al. |
| 5,499,046 A | 3/1996 | Schiller et al. |

(Continued)

FOREIGN PATENT DOCUMENTS

| | | |
|---|---|---|
| CA | 2 466 458 | 12/2004 |
| EP | 0 713 184 | 5/1996 |

(Continued)

OTHER PUBLICATIONS

Hurst et al., "MPEG Splicing: Tutorial and Proposed SMPTE Standard," SMPTE Journal: pp. 1-14 (Nov. 1998).

(Continued)

*Primary Examiner* — Benjamin R Bruckart
*Assistant Examiner* — Jason Thomas

(57) ABSTRACT

Described are computer-based methods and apparatuses, including computer program products, for deterministically skewing transmission of content streams. A content stream comprising one or more video frames is received. The content stream is buffered in a buffer, wherein the buffer allows simultaneous read access to the content stream at a plurality of locations. One or more video frames of the content stream are transmitted from the buffer to a first device associated with a first subscriber beginning at a first location in the buffer based on a first transmission delay parameter. One or more video frames of the content stream are transmitted from the buffer to a second device associated with a second subscriber beginning at a second location in the buffer based on a second transmission delay parameter.

27 Claims, 9 Drawing Sheets

(51) Int. Cl.
    *H04N 21/239* (2011.01)
    *H04N 7/173* (2011.01)
    *H04N 21/6437* (2011.01)
    *H04N 21/647* (2011.01)
    *H04N 21/845* (2011.01)
    *H04N 21/438* (2011.01)

(52) U.S. Cl.
    CPC ... *H04N 21/6437* (2013.01); *H04N 21/64784* (2013.01); *H04N 21/8455* (2013.01)

(56) References Cited

U.S. PATENT DOCUMENTS

| | | |
|---|---|---|
| 5,534,944 A | 7/1996 | Egawa et al. |
| 5,550,577 A | 8/1996 | Verbiest et al. |
| 5,594,490 A | 1/1997 | Dawson et al. |
| 5,655,117 A | 8/1997 | Goldberg et al. |
| 5,659,539 A | 8/1997 | Porter et al. |
| 5,805,804 A | 9/1998 | Laursen et al. |
| 5,859,660 A | 1/1999 | Perkins et al. |
| 5,864,682 A | 1/1999 | Porter et al. |
| 5,878,220 A | 3/1999 | Olkin et al. |
| 5,926,649 A | 7/1999 | Ma et al. |
| 6,055,577 A | 4/2000 | Lee et al. |
| 6,112,226 A | 8/2000 | Weaver et al. |
| 6,119,154 A | 9/2000 | Weaver et al. |
| 6,138,147 A | 10/2000 | Weaver et al. |
| 6,154,496 A | 11/2000 | Radha |
| 6,401,126 B1 | 6/2002 | Douceur et al. |
| 6,480,539 B1 | 11/2002 | Ramaswamy |
| 6,567,471 B1 | 5/2003 | Yoshinari |
| 6,578,070 B1 | 6/2003 | Weaver et al. |
| 6,912,251 B1 | 6/2005 | Ward et al. |
| 6,937,770 B1 | 8/2005 | Oguz et al. |
| 6,944,585 B1 | 9/2005 | Pawson |
| 6,971,119 B1 | 11/2005 | Arsenault et al. |
| 7,058,721 B1 | 6/2006 | Ellison et al. |
| 7,107,309 B1 | 9/2006 | Geddes et al. |
| 7,412,533 B1 | 8/2008 | Johnson |
| 7,561,515 B2 | 7/2009 | Ross |
| 7,746,799 B2 * | 6/2010 | Kokot et al. ............... 370/252 |
| 7,885,270 B2 | 2/2011 | Frink |
| 8,325,764 B2 | 12/2012 | Frink |
| 8,335,262 B2 | 12/2012 | Hluchyj |
| 8,364,892 B2 | 1/2013 | Hluchyj |
| 8,650,602 B2 | 2/2014 | Pond |
| 8,743,906 B2 | 6/2014 | Branam |
| 8,750,315 B2 | 6/2014 | Dandekar |
| 8,799,535 B2 | 8/2014 | Hluchyj |
| 2002/0013864 A1 | 1/2002 | Dandrea |
| 2003/0208765 A1 | 11/2003 | Urdang et al. |
| 2004/0218617 A1 | 11/2004 | Sagfors |
| 2005/0188099 A1 | 8/2005 | Patel |
| 2005/0193410 A1* | 9/2005 | Eldering ............... 725/34 |
| 2005/0223107 A1 | 10/2005 | Mine et al. |
| 2005/0256873 A1 | 11/2005 | Walker et al. |
| 2006/0165088 A1 | 7/2006 | Monta et al. |
| 2006/0171390 A1* | 8/2006 | La Joie ............ H04L 12/2801 370/390 |
| 2006/0230176 A1 | 10/2006 | Dacosta |
| 2006/0294555 A1 | 12/2006 | Xie |
| 2007/0055984 A1 | 3/2007 | Schiller et al. |
| 2007/0070895 A1 | 3/2007 | Narvaez |
| 2007/0121629 A1* | 5/2007 | Cuijpers et al. ............ 370/390 |
| 2007/0130597 A1* | 6/2007 | Parker et al. ............... 725/94 |
| 2009/0083811 A1 | 3/2009 | Dolce et al. |
| 2009/0083813 A1 | 3/2009 | Dolce et al. |
| 2009/0180534 A1 | 7/2009 | Hluchyj et al. |
| 2009/0182790 A1 | 7/2009 | Hluchyj et al. |
| 2009/0182843 A1 | 7/2009 | Hluchyj et al. |
| 2009/0182939 A1 | 7/2009 | Hluchyj et al. |
| 2010/0046604 A1* | 2/2010 | Elstermann ............ 375/240.01 |

FOREIGN PATENT DOCUMENTS

| | | |
|---|---|---|
| EP | 0 755 157 A2 | 1/1997 |
| EP | 0 772 360 | 5/1997 |
| EP | 0 805 593 | 11/1997 |
| EP | 1115252 A2 | 7/2001 |
| EP | 1 365 587 | 11/2003 |
| EP | 1655963 A2 | 5/2006 |
| EP | 1 675 399 | 6/2006 |
| WO | WO 98/54646 | 12/1998 |
| WO | WO 01/56285 | 8/2001 |
| WO | WO 02/08917 | 1/2002 |
| WO | WO 02/09425 A1 | 1/2002 |
| WO | WO 2007/028245 | 3/2007 |

OTHER PUBLICATIONS

ISO/IEC 13818-1: ITU-T Recommendation H.222.0: Series H: Audiovisual and Multimedia Systems: Infrastructure of Audiovisual Services—Transmission Multiplexing and Synchronization; Information Technology—Generic Coding of Moving Pictures and Associated Audio Information Systems: 1-171 (May 27, 1999).

SCTE 35 (ITU-T J.181) ANST/SCTE 35 2004: Digital Program Insertion Cueing Message for Cable, pp. 1-37 (2004).

Carretero, J., et al., "A hierarchical disk scheduler for multimedia systems," Future Generations Computer Systems, Elsevier Science Publisher. Amsterdam, NL, vol. 19, No. 1, Jan. 1, 2003, pp. 23-35.

Mourad, A., "Issues in the design of a storage server for video-on-demand," Multimedia Systems, ACM, New York, NY, US, 4:70-86 (1996).

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

Non-Final Office Action from co-pending U.S. Appl. No. 12/393,904, dated Jul. 13, 2011, 14 pages.

Final Office Action from co-pending U.S. Appl. No. 12/393,904, dated Apr. 27, 2012, 13 pages.

Nonfinal office action for co-pending U.S. Appl. No. 12/393,904, dated Aug. 29, 2014, 26 pages.

Final office action for co-pending U.S. Appl. No. 12/393,904, dated Jul. 6, 2015, 39 pages.

Amendment/response to office Action submitted in U.S. Appl. No. 12/393,904, Jan. 11 2012, 13 pages.

Amendment/response to office Action submitted in U.S. Appl. No. 12/393,904, Oct. 30 2012, 15 pages.

Amendment/response to office Action submitted in U.S. Appl. No. 12/393,904, Feb. 27, 2015, 14 pages.

Amendment/response to office Action submitted in U.S. Appl. No. 12/393,904, Dec. 30, 2015, 13 pages.

Office Action for U.S. Appl. No. 12/393,904 issued Mar. 15, 2016, 47 pages.

Response to Office Action for U.S. Appl. No. 12/393,904, filed Aug. 15, 2016, 7 pages.

Final Office Action for U.S. Appl. No. 12/393,904 issued Nov. 18, 2016, 30 pages.

* cited by examiner

DETERMINISTICALLY SKEWING TRANSMISSION OF CONTENT STREAMS

FIELD OF THE INVENTION

The present invention relates generally to computer-based methods and apparatuses, including computer program products, for deterministically skewing synchronized events for content streams.

BACKGROUND

Video that is transmitted in the radio frequency (RF) spectrum (e.g., distributed from a cable head-end) may use Quadrature Amplitude Modulation (QAM), or for terrestrial broadcasts (e.g., Advanced Television Systems Committee (ATSC) over air in the US) 8-Vestigial Sideband Modulation (8VSB), or Coded Orthogonal Frequency Division Multiplexing (COFDM) in Europe. Both convert the digital video into a modulated RF signal that is up-converted and transmitted in the analog RF spectrum. For example, 256-QAM has approximately a 5.1 MHz symbol rate at 6 MHz, with each symbol capable of representing 8 bits of information. This means a 256-QAM channel is able to transmit approximately 40 Mbps of digital data information within the 6 MHz RF Channel (note that Europe uses 8 MHz channels). Including noise reduction methods, such as Forward Error Correction (FEC), this translates into roughly ten (10) 3.75 Mbps digitally compressed video programs that fit within the 6 MHz channel bandwidth, instead of just a single analog program. The modulated digital video is formatted using MPEG-2 (for Moving Picture Experts Group) Transport Streams (MPEG-2 TS), and each home's television or set top box (STB) that is capable of receiving the transmission tunes to a particular RF channel to decode a program.

The RF spectrum limits the number of unique 6 MHz channels that are available for transmitting digital data and video. As a result, this limits the number of unique video programs that can be broadcast (or transmitted) at any one time to homes, especially when sharing the same Hybrid Fiber Coaxial (HFC, as in a Cable deployment) since they all would share the same RF spectrum. This limitation is also true for homes sharing the same passive optical network (PON, such as a gigabit PON, or GPON) in a Telco deployment (typically a single wavelength is used for an RF overlay). Finding ways to reclaim the analog television RF spectrum is a high priority for cable providers. This means looking at Switched Digital Video (SDV) approaches to selectively provide more digital content, as well as an effort to move toward an Internet Protocol Television (IPTV) infrastructure where the video is transported using IP data networks (e.g., Data Over Cable Interface Specification (DOCSIS)). In a cable deployment, QAM can still be used for transmitting digital data (i.e., DOCSIS), while in a Telco deployment Very high bit-rate Digital Subscriber Line (VDSL) and Passive Optical Networking (PON, such as a B/GPON) may be used. Each solution transports Ethernet frames and provides access to an IP network.

In IPTV networks, video data is typically wrapped in a transport layer (e.g., Real-time Transport Protocol (RTP), Transmission Control Protocol (TCP), User Datagram Protocol (UDP)) and then multicast or unicast across the network. An IP packet would generally contain up to seven (7) 188-byte MPEG-2 TS packets, or some number up to the Maximum Transmission Unit (MTU) of the network. IP multicast is common for distributing live content broadcast channels that are viewed or consumed in real-time by multiple subscribers, where IP unicast is used for per-subscriber delivery. For broadcast channels, each has a unique IP multicast address that devices (e.g., a STB) "join" (e.g., using the Internet Group Management Protocol (IGMP)) in order to access a channel or program. Per-subscriber delivery uses a separate IP unicast address for each device. This allows viewing of content by a single device, such as for accessing on-demand content and for personalized broadcast video (e.g., with per-subscriber advertisement placements).

An MPEG-2 TS is typically used for transporting digital live content since MPEG TS includes timing information (e.g., a Program Clock Reference (PCR)) that creates a synchronous relationship between a real-time encoder and decoder (e.g., STB). When the content (e.g., a television program) is fed into an MPEG encoder, the process produces a Single Program Transport Stream (SPTS) containing audio and video data. The SPTS is comprised from Packetized Elementary Streams (PES) containing separate audio and video Elementary Streams (ES). A video ES may be coded as MPEG-2 or H.264/AVC (for Advanced Video Coding), depending on the requirements of the service provider. Typically, one or more audio PES is included in an SPTS (e.g., for multiple audio PES, each for a particular language) along with a video PES. Data may also be carried in the MPEG-2 TS, such as for Program Specific Information (PSI), Electronic Program Guide (EPG), and advanced services.

Once the SPTS is created at the encoder, the SPTS may optionally be fed into a multiplexer which inputs multiple SPTSs and creates a multiplex referred to as a Multi Program Transport Stream (MPTS). When an MPTS is received by a device, the device reads the PSI and the Program ID (PID) in each 188-byte MPEG-2 TS packet to de-multiplex the stream. The PSI associates each program's content with a PID, which the device uses to selectively extract the audio and video PES from the MPTS that the device uses to display (e.g., on a TV) or store (e.g., on a DVR).

The SPTS and MPTS may be transported as Constant Bit Rate (CBR) or as Variable Bit Rate (VBR) depending on the requirements of the distribution network (e.g., Edge Quadrature Amplitude Modulation (EQAM) in a Multiple System Operator (MSO) may require CBR and the device decoder. For CBR delivery, MPEG-2 TS "Null" packets may need to be added to the data stream in order to maintain a constant bit rate. An MPTS multiplexer may also need to reduce the bit rate of one or more SPTS streams (i.e., clamping or trans-rating) when the coincident rate of the combined streams exceeds the target transport capacity (e.g., QAM, GbE, etc.). This operation is performed at the Elementary Stream (ES) level, and involves modifying Discrete Cosine Transform (DCT) coefficients, variable length codes, removing coded Blocks, and skipping Macroblocks, etc. Processing at the ES level is generally considered an expensive operation, to be performed as necessary.

The coding standards for Digital Television involve inter-picture coding (ISO MPEG-2 and H.264/AVC, Microsoft VC-1, etc.) for higher coding efficiency, typically requiring one or more video pictures (interchangeably called frames) to decode many of the other pictures. The transmission order and the display order of an inter-picture coded Group of Pictures (GOP) is generally different, since B-pictures are bi-directionally predicted from a future picture (and possibly the next GOP). For example, the first two (2) B-pictures of a GOP may be backward predicted from the first I-picture (e.g., no forward prediction from a prior GOP). Such a GOP ends at the last P-picture, with no references made to that P-picture from a future GOP. The first I-picture needs to be sent and decoded first so that the I-picture can be used to decode the following B-pictures. Typically, I-pictures tend to be bigger than the size of P-pictures and P-pictures tend to be bigger than the size of B-pictures. If all of the SPTS streams are aligned at delivery (e.g., all the I-pictures are sent at the same time), then the bandwidth that is allocated to the transmission medium needs to be high enough to support the peak rate of all the I-frames.

In IPTV deployments, often times only the selected video (e.g., video that a subscriber has selected to watch) is sent to the device (e.g., to a device associated with the subscriber) over an IP data network (e.g., DOCSIS, VDSL, GPON, Ethernet, etc.) to the STB, making it possible to customize each viewing experience. This applies to both stored content (e.g., on-demand and timeshift TV) as well as live content broadcasts. In the case of live content broadcasts, multiple viewers may be watching the same program, but advertisements at commercial breaks may be customized based on, for example, geography and the learned preferences of each subscriber (e.g., per-subscriber advertising).

Live content broadcast video is synchronous by nature, since programs tend to start and stop at predetermined times (e.g., time according to the wall clock). For example, networks (ABC, CBS, NBC, etc.) satellite broadcast programs to local affiliates, which then rebroadcast the content. Channel changing is often clustered at the start and end of programming, since people tend to look for "what else is on," or what content is on other channels. Advertisements are generally placed at predetermined times, even across multiple television channels (e.g., at the beginning and the end of programs and at fixed intervals within the programs). There is also the occasional unexpected content (e.g., breaking news) or unusual event that occurs (e.g., an event not typically shown again by a network because that event is "not appropriate") that may also cause a large number of subscribers to simultaneously perform a Timeshift TV rewind. All these events, some separate and some combined, tend to create sharp spikes in subscriber activity at nearly the same time due to the synchronous nature of time driven broadcast.

IPTV networks supporting a unicast model of delivery observe the high correlation between program and time by receiving signaling events (e.g., from a STB) from each subscriber (e.g., using Real Time Streaming Protocol (RTSP)), nearly at the same time. These events may occur, for example, due to a channel change (e.g., channel changing at the top and bottom of the hour when channel surfing, looking for what else is on, primetime programming, etc.). The events may also occur during ad splicing (e.g., at the start and end of a program, predetermined intervals within program, etc.). The events may also occur during a focused rewind (e.g., something unusual or unexpected happens on popular content and everyone wants to see or hear the event, such as in Timeshift TV when everyone rewinds at same time, etc.)

Stored content selection can be naturally distributed over a larger time frame (e.g., due to different STB request times, since each user may request the stored content for viewing at unrelated times based on personal preference), and content access is generally more tolerant of delivery delay. However, in a live content unicast delivery system, where each subscriber receives a separate video stream (e.g., to their STB), possibly the same or different channel, the signaling requests from the subscribers (e.g., changing channels) can tend to be clustered in a very small time window as a result of the natural alignment of program delivery. The video delivery system is burdened with receiving and processing all of the requests in a very short window of time. This sharp peak in the request rate will often subside once subscribers find the programming they desire, and the signaling requests will fall to a relatively low number. This makes the peak to average ratio of request very high, and may result in a need for the video delivery system to be sized to handle the "peak" signaling events, or possibly increase the video delivery system's processing delay (e.g., a change channel may take very long time to happen during peak signaling events, while not long during average signaling events).

Fast channel change performance can be especially important in a unicast video delivery system, since the request to change channels is sent back to the video delivery system, rather than at the STB (e.g., by tuning to a different QAM RF). The video delivery system's ability to respond quickly is essential to the utility of the solution. If the number of channel change requests becomes too high during the same period in time, the signaling control may not be able to respond quickly enough to all requests.

Per-subscriber ad splicing in live content broadcast streams is similarly exposed to the synchronous nature of television, since ad placements tend to be located at the start and end of programs and at fixed intervals therein. This is generally also true across different television channels, resulting in the simultaneous access to stored advertisements that may or may not reside on the same video delivery system (e.g., each ad placement contends for access to the same storage device). If the number of simultaneous requests to storage exceeds the storage bandwidth capacity, such a condition may result in a video underflow or a missed ad placement. Further, there is a limited time window for determining an ad placement (e.g., a four second count down that is signaled in a live content broadcast feed), that compounds the control plane problem when all ad placements coincide in time.

Timeshift TV is an application where a live content program is broadcast in real-time and is also simultaneously stored. This allows a subscriber to "pause" live TV, rewind, and fast forward to "catch up" to live. In the case of many subscribers watching the same live content program, and something happens that causes everyone to rewind, this creates a problem similar to ad splicing, in that there are many highly correlated requests to access the storage system (to see something in the past that is stored). This can overwhelm both the control plane, as in channel changing, and the storage system (random access to multiple places in file).

SUMMARY OF THE INVENTION

The techniques described herein include methods, apparatuses, and computer program products for deterministically skewing synchronized events for content streams. In one aspect, there is a method. The method is a computerized method. The method includes receiving a content stream comprising one or more video frames. The method also includes buffering the content stream in a buffer, wherein the buffer allows simultaneous read access to the content stream at a plurality of locations. The method also includes transmitting one or more video frames of the content stream from the buffer to a first device associated with a first subscriber beginning at a first location in the buffer based on a first transmission delay parameter. The method also includes transmitting one or more video frames of the content stream from the buffer to a second device associated with a second subscriber beginning at a second location in the buffer based on a second transmission delay parameter.

In another aspect, there is a method. The method is a computerized method. The method includes buffering a first content stream comprising at least one content processing location in a first buffer, wherein the first buffer is associated with a first processing delay parameter. The method also includes buffering a second content stream in a second buffer, the second content stream comprising at least one content processing location, the second buffer being associated with a second processing delay parameter that is different from the first processing delay parameter. The method also includes processing the first content stream at the at least one content processing location of the first content stream at a first content processing time based on the first processing delay parameter. The method also includes processing the second content stream at the at least one content processing location of the second content stream at a second content processing time based on the second processing delay parameter.

In another aspect there is a system. The system includes an ingest module configured to receive a content stream comprising one or more video frames. The system also includes a buffer in communication with the ingest module configured to buffer the content stream, wherein the buffer allows simultaneous read access to the buffered content stream at a plurality of locations. The system also includes a delivery module in communication with the buffer configured to transmit one or more video frames of the content stream from the buffer to a first device associated with a first subscriber beginning at a first location in the buffer based on a first transmission delay parameter. The delivery module is also configured to transmit one or more video frames of the content stream from the buffer to a second device associated with a second subscriber beginning at a second location in the buffer based on a second transmission delay parameter.

In another aspect there is a system. The system includes a first buffer associated with a first processing delay parameter. The system also includes a second buffer associated with a second processing delay parameter. The system also includes an ingest module in communication with the first buffer and the second buffer configured to buffer a first content stream comprising at least one content processing location in the first buffer. The ingest module is also configured to buffer a second content stream in the second buffer, the second content stream comprising at least one content processing location. The ingest module is also configured to process the first content stream at the at least one content processing location of the first content stream at a first content processing time based on the first processing delay parameter. The ingest module is also configured to process the second content stream at the at least one content processing location of the second content stream at a second content processing time based on the second processing delay parameter.

In another aspect, there is a computer program product. The computer program product is tangibly embodied in a computer readable medium. The computer program product includes instructions being operable to cause a data processing apparatus to receive a content stream comprising one or more video frames. The instructions are also operable to cause a data processing apparatus to buffer the content stream in a buffer, wherein the buffer allows simultaneous read access to the content stream at a plurality of locations. The instructions are also operable to cause a data processing apparatus to transmit one or more video frames of the content stream from the buffer to a first device associated with a first subscriber beginning at a first location in the buffer based on a first transmission delay parameter. The instructions are also operable to cause a data processing apparatus to transmit one or more video frames of the content stream from the buffer to a second device associated with a second subscriber beginning at a second location in the buffer based on a second transmission delay parameter.

In another aspect, there is a computer program product. The computer program product is tangibly embodied in a computer readable medium. The computer program product includes instructions being operable to cause a data processing apparatus to buffer a first content stream comprising at least one content processing location in a first buffer, wherein the first buffer is associated with a first processing delay parameter. The instructions are also operable to cause a data processing apparatus to buffer a second content stream in a second buffer, the second content stream comprising at least one content processing location, the second buffer being associated with a second processing delay parameter that is different from the first processing delay parameter. The instructions are also operable to cause a data processing apparatus to process the first content stream at the at least one content processing location of the first content stream at a first content processing time based on the first processing delay parameter. The instructions are also operable to cause a data processing apparatus to process the second content stream at the at least one content processing location of the second content stream at a second content processing time based on the second processing delay parameter.

In another aspect, there is a system. The system includes means for receiving a content stream comprising one or more video frames. The system also includes means for buffering the content stream, wherein the buffering means allows simultaneous read access to the buffered content stream at a plurality of locations. The system also includes means for transmitting one or more video frames of the content stream from the buffering means to a first device associated with a first subscriber beginning at a first location of the buffering means based on a first transmission delay parameter, and transmitting one or more video frames of the content stream from the buffering means to a second device associated with a second subscriber beginning at a second location of the buffering means based on a second transmission delay parameter.

In another aspect, there is a system. The system includes means for buffering a first content stream comprising at least one content processing location in a first buffer, the first buffer being associated with a first processing delay parameter. The means also buffer a second content stream comprising at least one content processing location in a second buffer, the second buffer being associated with a second processing delay parameter. The means also process the first content stream at the at least one content processing location of the first content stream at a first content processing time based on the first processing delay parameter. The means also process the second content stream at the at least one content processing location of the second content stream at a second content processing time based on the second processing delay parameter.

In other examples, any of the aspects above can include one or more of the following features. The first transmission delay can be associated with a plurality of devices associated with the first subscriber. A different transmission delay can be associated with each device from a plurality of devices associated with the first subscriber. Transmitting one or more video frames of the content stream from the buffer to the first device can include pointing a read pointer associated with the first device at a location in the buffer based on the first transmission delay parameter, and transmitting one or more video frames of the content stream from the buffer to the first device beginning with a video frame at the location pointed to by the read pointer.

In some examples, buffering includes generating index information for the content stream, the index information comprising location data for the one or more video frames in the buffer. Transmitting one or more video frames of the content stream from the buffer to the first device can include pointing a read pointer associated with the first device at a location in the buffer based on the first transmission delay parameter and the index information and transmitting one or more video frames of the content stream from the buffer to the first device beginning with a video frame at the location pointed to by the read pointer. Transmitting one or more video frames of the content stream from the buffer to the second device can include pointing a read pointer associated with the second device at a location in the buffer based on the second transmission delay parameter and transmitting one or more video frames of the content stream from the buffer to the second device beginning with a video frame at the location pointed to by the read pointer.

In other examples, a content request is received from the first device, wherein the content associated with the content request is buffered in a second buffer, and the first transmission delay parameter is maintained for the first device with the second buffer. Maintaining can include pointing a read pointer associated with the first device at a location in the second buffer based on the first transmission delay parameter, and transmitting one or more video frames of a content stream from the second buffer to the first device beginning with a video frame at the location pointed to by the read pointer. The content stream can be a live broadcast. The first location and the second location can include a random access point.

In some examples, the first transmission delay parameter is computed as an offset to a write pointer. Buffering can include buffering a first frame of the one or more video frames of the content stream in the buffer, and advancing the write pointer of the buffer to a next location in the buffer. Transmitting one or more video frames of the content stream from the buffer to the first device can include transmitting a video frame beginning at the first location from the buffer to the first device, the first location pointed to by a read pointer associated with the first device, and advancing the read pointer to a next location in the buffer.

In other examples, a size of the buffer is determined based on a maximum transmission delay parameter, wherein the first transmission delay parameter and the second transmission delay parameter are less than or equal to the maximum transmission delay parameter. The maximum transmission delay parameter can be modified based on a number of read pointers associated with the buffer, a processing performance value, or any combination thereof. The size of the buffer can be modified based on the modified maximum transmission delay parameter. The content stream can be a MPEG-2 transport stream, an Adobe RTMP-based stream, an interleaved RTSP-based stream, or any combination thereof.

In some examples, each of the first transmission delay parameter and the second transmission delay parameter is associated with a predetermined value. A value associated with each of the first transmission delay parameter and the second transmission delay parameter can be determined based on a random number comprising a range based on the predetermined time period. A value associated with each of the first transmission delay parameter and the second transmission delay parameter can be determined by adding a predetermined incremental value to a previously determined transmission delay parameter. Content processing of the content stream can be performed, wherein content processing includes performing ad insertions, graphical overlays, transrating, transformations, or any combination thereof.

In other examples, the second content stream has the same delivery time as the first content stream. Content processing can include performing ad insertions, graphical overlays, transrating, transformations, or any combination thereof. A first delivery time of the at least one content processing location of the first content stream and a second delivery time of the at least one content processing location of the second content stream can be equal. The second content stream can be a copy of the first content stream.

In some examples the first content stream is buffered in a third buffer associated with a first transmission delay parameter, and the second content stream is buffered in a fourth buffer associated with a second transmission delay parameter. One or more video frames can be transmitted from the third buffer to a first device associated with a first subscriber based on the first transmission delay parameter, and one or more video frames can be transmitted from the fourth buffer to a second device associated with a second subscriber based on the second transmission delay parameter, wherein the first transmission delay parameter offsets the first processing delay parameter and the second transmission delay parameter offsets the second processing delay parameter.

In other examples, the third buffer allows simultaneous read access to the one or more video frames at a plurality of locations. One or more video frames can be transmitted from the third buffer to a first device associated with a first subscriber beginning at a first location in the buffer based on the first transmission delay parameter, and one or more video frames can be transmitted from the third buffer to a second device associated with a second subscriber beginning at a second location in the buffer based on a third transmission delay parameter. A content request can be received from the first device, wherein the content associated with the content request is buffered in a fifth buffer, and the first transmission delay parameter is maintained for the first device with the fifth buffer. Maintaining can include pointing a read pointer associated with the first device at a location in the fifth buffer based on the first transmission delay parameter, and transmitting one or more video frames from the fifth buffer to the first device beginning with a video frame at the location pointed to by the read pointer.

In some examples, transmitting one or more video frames from the third buffer to the first device includes transmitting a video frame beginning at the first location from the third buffer to the first device, the first location pointed to by a read pointer associated with the first device, and advancing the read pointer to the next location in the buffer. A read pointer associated with a first device can be pointed at a location in the third buffer based on the first transmission delay parameter, and one or more video frames can be transmitted from the third buffer to the first device beginning with a video frame at the location pointed to by the read pointer.

In other examples, buffering the first content stream in the third buffer includes generating index information, the index information comprising location data for the one or more video frames in the third buffer. A read pointer associated with a first device can be pointed at a location in the third buffer based on the first transmission delay parameter and the index information, and one or more video frames can be transmitted from the third buffer to the first device beginning with a video frame at the location pointed to by the read pointer. The first content stream, the second content stream, or both can be a MPEG-2 transport stream, an Adobe RTMP-based stream, an interleaved RTSP-based stream, or any combination thereof.

In some examples, a third buffer is in communication with the ingest module, the third buffer being associated with a first transmission delay parameter, and a fourth buffer is in communication with the ingest module, the fourth buffer being associated with a second transmission delay parameter. The ingest module can be further configured to buffer the first content stream in the third buffer, and buffer the second content stream in the fourth buffer. A delivery module can be in communication with the third buffer and the fourth buffer, the delivery module being configured to: transmit one or more video frames from the third buffer to a first device associated with a first subscriber based on the first transmission delay parameter, and transmit one or more video frames from the fourth buffer to a second device associated with a second subscriber based on the second transmission delay parameter, wherein the first transmission delay parameter offsets the first processing delay parameter and the second transmission delay parameter offsets the second processing delay parameter.

The techniques, which include both methods and apparatuses, described herein can provide one or more of the following advantages. Advantageously, when SPTS streams at delivery are skewed slightly in time, (e.g., the I-pictures are not all sent at the same time) the smaller P-pictures and B-pictures can overlap the I-pictures, reducing the peak bandwidth requirement (e.g., such time shifting can be used in statistical multiplexing (stat muxing) applications). Since the request to change channels is sent back to the video delivery system, rather than at the STB, by distributing and spreading the delivery of unicast channels over a larger time window than normal, the requests are also spread over a larger window, which reduces the load on the signaling control.

Because simultaneous requests to storage that exceed the storage bandwidth capacity can result in video underflow or a missed ad placement, by distributing the number of storage requests for ads over a larger time window, more ad placements can be made on more streams, and with a higher success rate. Additionally, for applications such as Timeshift TV that are vulnerable to many highly correlated requests to access a storage system (e.g., to see something in the past that is stored), by distributing the delivery of the live content program to each subscriber, the number of simultaneous requests can be smoothed.

Simultaneous processing requests may occur coincident with others when the received content streams are coincident with respect to the timing of the processing. For example, an ad insertion may need to occur on many ingested streams at the same time due to the synchronous nature of live broadcast television. By distributing the number of content processing operations over a larger time window, more processing may be performed with fewer processing resources.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, signaling requests are distributed over a larger window of time, so that a video delivery system can respond to more subscriber requests with less observable delay. This is done by staggering the delivery of per-subscriber unicast video over a larger window of time than naturally occurring (e.g., even if from the same source). Advantageously, the number of simultaneous signaled events or content processing events (e.g., ad insertions) can also be spread over the same window of time (i.e., a larger averaging window), reducing the peak rate of requests and processing load. Although the specification describes these techniques mostly in terms of the subscriber, the techniques described herein work equally as well on individual devices, such as STBs.

Figure 1:
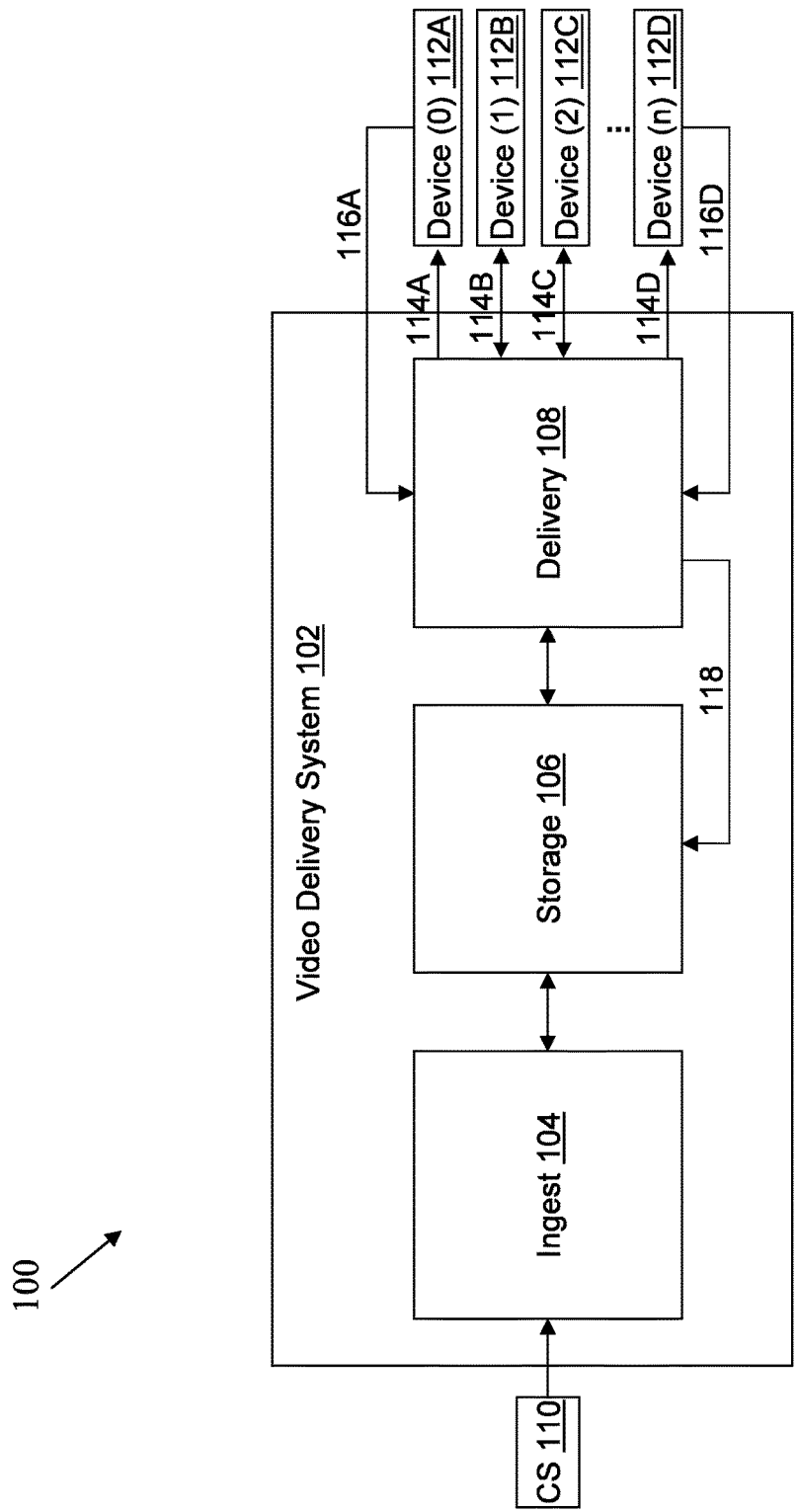
FIG. 1 is an exemplary diagram illustrating a video delivery system.

FIG. 1 is an exemplary diagram 100 illustrating a video delivery system 102. The video delivery system 102 includes the ingest module 104, storage module 106, and delivery module 108. Content stream 110 is received through the ingest module 104. The ingest module 104 is in communication with the storage module 106. The storage module 106 is in communication with the delivery module 108. Delivery module 108 is in communication with one or more devices, device (0) 112A, device (1) 112B, device (2) 112C, through device (n) 112D, collectively devices 112, through a communication network. Delivery module 108 transmits content 114A, 114B, 114C, and 114D, collectively content 114, to the devices 112A, 112B, 112C, and 112D, respectively. The devices 112 send signaling 116A through 116D to the delivery module 108. The delivery module 108 sends content requests 118 to the storage module 106.

The video delivery system 100 can interface directly with multiple subscribers' devices (e.g., devices 112) to provide a variety of content, or indirectly, through some other interface (not shown). A subscriber may be associated with one or more devices 112, such as STBs. For example, some subscribers may have two or more STBs in their house, for example, a first STB in their family room and a second STB in a bedroom. Other subscribers may just have one STB in their house.

The content stream 110 can be, for example, a MPTS or SPTS. Content 114 can be a SPTS. The content stream 110 can be live content (e.g., a live broadcast of a sporting event, which can be delayed from the actual time such content is recorded due to processing and/or transmission delays) and/or non-live content (e.g., previously captured elsewhere, such as a movie). The content stream 110 can be ingested in different formats (e.g., MPEG-2 TS, HTTP, etc.). The content 114 can be delivered in different formats (e.g., HTTP, TCP, UDP, RTP, etc.). The content stream can be, for example, an MPEG-2 transport stream, an Adobe RTMP-based stream, an interleaved RTSP-based stream, or any other type of stream.

The ingest module 104 receives the content stream 110 (e.g., an MPTS or SPTS video stream that is sent as IP unicast or multicast). The ingest module 104 processes the content stream 110 for storage. The ingest module 104 processing includes network protocol processing (e.g., UDP, RTP, TCP, FTP, HTTP, etc.) for the arriving content stream and, if arriving as MPTS, demultiplexing into separate SPTS streams. The ingest module 104 creates indexing information (e.g., an index file) that is used for randomly accessing the content for delivery. The index information can be created for video frames stored both in permanent storage (e.g., flash memory) as well as in temporary storage (e.g., the buffers using memory devices) in the storage module 106. The index information includes, for example, an index type (e.g., I-frame start, I-frame end, video out-point, audio out-point, video in-point, audio in-point), an index position within the content, an index Decoding Timestamp (DTS), and an index Presentation Timestamp (PTS). The location and timing information can be used to select video frames at any point in the stored location. The index file can be used to access the content for various operations, such as, for example, fast channel change, trick play, and ad splicing. For ad splicing operations, cue messages (e.g., as defined in SCTE 35) identify the locations within the content stream where ads maybe inserted, and are indexed by the ingest module for use in later splicing operations.

In the case of a live content video stream, the index file may be kept, for example, as long as the content is present in the video delivery system 102 (e.g., from ingest at the ingest module 104, to buffering at the storage module 106, to delivery via the delivery module 108). For more persistently stored content, the index file can be kept as long as the content persists in the storage system 106. The storage module 106 can provide long-term storage (e.g., using hard disk drive, flash memory, etc.) for content that is generally kept and viewed over hours or days. For example, the storage module 106 can include permanent storage. The permanent storage can transmit content to the delivery module 108, and the delivery module 108 can transmit content requests (e.g., content request 118) to the permanent storage. The storage module 106 can provide fast access memory for temporary storage (e.g., a broadcast buffer, or buffer, using DRAM for content that is transmitted nearly immediately). For example, the storage module 106 can include a buffer (e.g., a broadcast buffer). The buffer can transmit content to the delivery module 108, and the delivery module 108 can transmit content requests (e.g., content request 118) to the buffer.

The delivery module 108 performs delivery processing and transmits the content from the storage module 106 (e.g., from the permanent storage, a temporary buffer, etc.) to one or more devices 112 (e.g., subscriber STBs). For example, the delivery module 108 can receive content selection requests (e.g., signaling 116A, 116B) from one or more devices 112 (e.g., RTSP over IP network, Digital Storage Media Command and Control (DSM-CC) over Cable Quadrature Phase Shift Keying (QPSK) interface between the device and the video delivery system). In response to the content selection requests 116A, 116B, the delivery module 108 can access the storage module 106 (e.g., using the index information), and deliver the content (e.g., content 114) to devices 112.

The term "actual time" is used herein to refer to the actual time of day (e.g., a wall clock based on Greenwich Mean Time (GMT)). The term "write time" is used herein to refer to the time the ingest module 104 buffers a content stream frame to a storage module 106 buffer (e.g., the time a frame is written to one of the buffers 218 in the storage module 106 of FIG. 2). The write time is the time the frame would have been broadcast to a subscriber if the ingest module 104 did not buffer the frame in a storage module 106 buffer to deterministically skew synchronized events for the content stream the frame is associated with (e.g., as explained with reference to method 400 of FIG. 4). The term "most recent write time" for a content stream is used to refer to the write time of the most recently buffered frame for the content stream.

In some examples, the write time of a frame may equal the actual time the frame is being recorded. For example, if there are no delays, then a recording of a frame A of content stream A at 11:50:50 a.m. actual time also has a write time of 11:50:50 a.m. (i.e., the time frame A is buffered). However, in other, more typical examples, there may be a time difference between the actual time a frame is recorded and the actual time the data is written to the buffer (e.g., due to processing delays, encoding algorithms, transmission delays, etc.). For example, frame A may be recorded at an actual time of 11:50:20 a.m., but have a write time of 11:50:50 a.m. due to 30 seconds of processing, encoding and transmission delays. Unless stated otherwise, for exemplary purposes, this delay time between recording and writing can be ignored and the write time can be considered the recording time.

Figure 2:
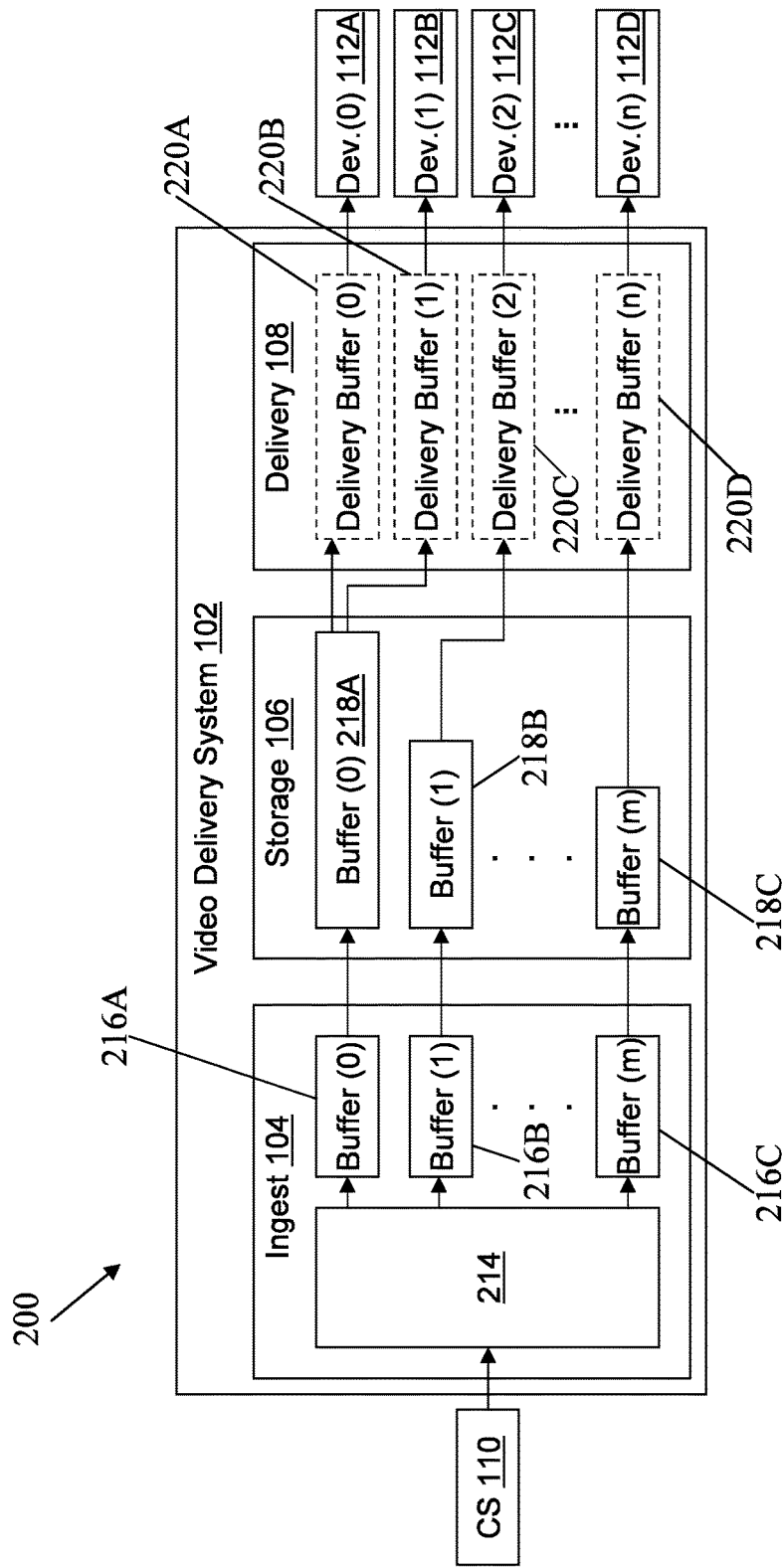
FIG. 2 is another exemplary diagram illustrating the video delivery system of FIG. 1 in more detail.

The term "read time" is used herein to refer to the time the delivery module 108 retrieves a content stream frame from the storage module 106 buffer (e.g., the time a frame is read from one of the buffers 218 in the storage module 106 of FIG. 2). In some examples, the read time of a frame may equal the actual time of presentation to a subscriber via a subscriber's device (e.g., a set top box). For example, if there are no delays, then a read of frame A from content from stream A that is made at actual time 11:50:51 a.m. causes frame A to be presented at the subscriber's device at actual time 11:50:51 a.m. However, in other, more typical examples, the actual time of a read of frame A may not coincide with the time the frame is actually presented at the subscriber's device and displayed (e.g., there can be processing time, decoding delays, transmission delays, queuing delays, etc.). For example, frame A may be read at an actual time of 11:50:20 a.m., but have a actual time of presentation at the subscriber's set top box of 11:50:50 a.m. due to 30 seconds of processing, decoding and transmission delays. Unless stated otherwise, for exemplary purposes, this delay time between reading and presentation can be ignored and the read time can be considered the presentation time.

The delay that is described in more detail below is the delay between the write time and the read time, referred to herein as a transmission delay parameter. In some examples, for a particular subscriber, the read time is equal to the write time plus a transmission delay parameter associated with that subscriber. The system includes different transmission delay parameters for different subscribers and/or groups of subscribers. The transmission delay parameter can range from 0 seconds up to the maximum delay the buffer can store. For example, subscriber A may be associated with a 10 second transmission delay parameter and subscriber B may be associated with a 20 second transmission delay parameter. In such an example, a frame written at 11:30:00 a.m. has a read time of 11:30:10 a.m. for subscriber A and a read time of 11:30:20 a.m. for subscriber B. Looked at from a different point of view, at 12:00:00 p.m. actual time, subscriber A is viewing content (e.g., a live event) recorded at 11:59:50 a.m. and subscriber B is viewing content recorded at 11:59:40 a.m. (e.g., ignoring the processing, encoding/decoding and transmission delays). Advantageously, if, for example, the live event ends at 12:00:00 p.m. actual time, subscriber A will watch to the end and will not request a channel change until 12:00:10 p.m. and subscriber B will watch to the end and not request a channel change until 12:00:20 p.m., thus spreading the request processing out over time.

FIG. 2 is an exemplary diagram 200 illustrating the video delivery system 102 of FIG. 1 in more detail. The video delivery system 102 includes ingest module 104, storage module 106, and delivery module 108. Ingest module 104 is in communication with the storage module 106. The storage module 106 is in communication with the delivery module 108. The delivery module 108 is in communication with one or more devices, device (0) 112A, device (1) 112B, device (2) 112C, through device (n) 112D, collectively devices 112, through a communication network.

The ingest module 104 receives content stream 110. The ingest module 104 includes a demultiplexer 214, which receives the content stream 110. The demultiplexer 214 is in communication with one or more ingest buffers, buffer (0) 216A, buffer (1) 216B, through buffer (m) 216C, collectively buffers 216. The demultiplexer 214 can, for example, demultiplex an MPTS content stream 110 into the associated SPTS content streams, buffering each of the SPTS content streams in a unique buffer from the buffers 216. If, for example, the content stream 110 is an SPTS, the demultiplexer 214 can be configured to store the SPTS content stream 110 in a buffer from the buffers 216, since the SPTS content stream 110 may not need to be demultiplexed further. The storage module 106 includes the same number of buffers as the ingest module 104, namely buffer (0) 218A, buffer (1) 218B, through buffer (m) 218C, collectively buffers 218. Each of the buffers 216 in the ingest module 104 is in communication with a buffer from the buffers 218 of the storage module 106 (e.g., buffer (0) 216A is in communication with buffer (0) 218A, etc., although a 1-to-1 communication is not needed).

Delivery module 108 optionally includes one or more delivery buffers, delivery buffer (0) 220A, delivery buffer (1) 220B, delivery buffer (2) 220C, through delivery buffer (n) 220D, collectively delivery buffers 220. Delivery buffer (0) 220A is in communication with device (0) 112A, delivery buffer (1) 220B is in communication with device (1) 112B, delivery buffer (2) 220C is in communication with device (2) 112C, and delivery buffer (n) 220D is in communication with device (n) 112D. The optional delivery buffers 220 can decouple the delivery module 108 from the buffers 218 of storage module 106. In some examples, the delivery buffers 220 can be output queues. The delivery buffers 220 can allow for variations in access latency of buffers 218 when, for example, multiple subscriber requests are made for content. Although the ingest module 104, the storage module 106, and the delivery module 108 are shown as separate components of the video delivery system 102, the functionality of the modules can be combined into one or more modules.

While the video delivery system 102 includes several buffers and/or queues (e.g., buffers 216, buffers 218, and optional delivery buffers 220), the buffers 218 of the storage module 106 are used to skew the delivery of content stored within the buffers 218 to different subscriber devices 112. Multiple devices 112 can access the same buffer 218 (and therefore, for example, the same SPTS) at the same point in time or at different points in time relative to the most recent write time of the content. For example, a live content stream, such as a sporting event, has a starting write time of 12:00:00 p.m. (i.e., the ingest module 104 buffers the first frame of the live content stream in a buffer 218 of the storage module 116 at the actual time of 12:00:00 p.m.). Because inherent delays are associated with the video transmission process (e.g., encoding video frames, ad splicing, network delays, bandwidth restrictions, emergency censoring delays, etc.), the captured live content does not reach the video delivery system immediately when the live content is recorded. As such, even though the write time of the first frame is 12:00:00 p.m., the frame may contain captured video that was recorded at an earlier actual time (e.g., the frame contains captured video recorded at 11:59:00 a.m. actual time). The buffer from the buffers 218 that the storage module 106 uses to buffer the live content sporting stream includes content not only of the beginning of the live content sporting stream, but also a portion of the content prior to the sporting event, such as a pre-game show with an initial write time of 11:30:00 a.m. and an ending write time of 12:00:00 p.m. If the actual time is 12:00:00 p.m. (i.e., the time on the wall clock), devices 112 can simultaneously access content from the buffer storing the live content sporting stream at the most recent write time of 12:00:00 p.m. (e.g., the most recent frame the ingest module 104 buffered into the buffer 218 of the storage module 106), and also content stored before the most recent write time, for example, content with a write time 11:59:59 a.m., a write time 11:58:00 a.m., and so on. In other words, the content delivered to the subscriber from the buffer can be delayed from the most recent write time, so that one or more subscribers could be viewing at 12:00:00 p.m. actual time a delayed stream showing live content action that occurred in the past relative to the most recent write time, e.g., at a write time of 11:59:45 a.m.

The size of the buffers 218 can be made larger or smaller based on a length parameter. For example, one or more of the buffers 218 can grow dynamically as determined by a distance between a write pointer and a read pointer associated with the buffer. In some examples, the size of one or more of the buffers 218 is statically configured (e.g., based on a predetermined minimum and maximum size). For example, a minimum size can be set (e.g., via configuration options of the video delivery system 102) to hold one or more GOPs of a video sequence (e.g., 1 or 2 seconds), and the maximum size can be set to equal some amount of time that the program content needs to be stored (e.g., 10 seconds, 10 minutes, etc.). While the buffers 218 are shown in FIG. 2 to have different lengths, the buffers 218 can have the same length (e.g., buffers 218 can have the same length based on a maximum transmission delay parameter required to support a device that can access all the buffers 218). The buffers 218 can support CBR or VBR video.

Figure 3:
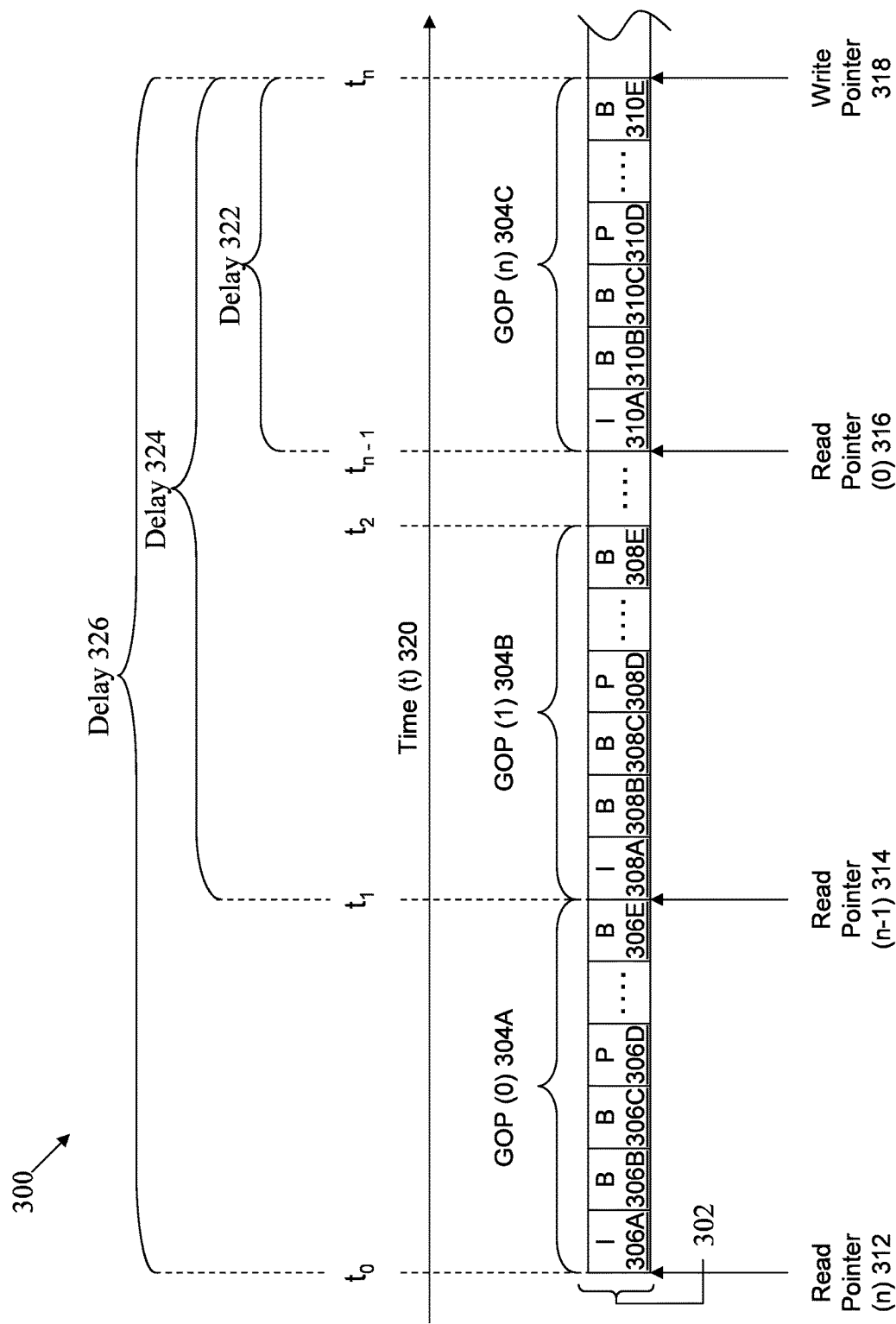
FIG. 3 is an exemplary diagram illustrating a buffer allowing simultaneous read access.

The principles described herein allow simultaneous read access to video content across a range of write times so that content requests/transmissions can be deterministically skewed. FIG. 3 is an exemplary diagram 300 illustrating a buffer 302 (e.g., one of the buffers 218 of FIG. 2) allowing simultaneous read access to the contents of the buffer 302. The buffer 302 includes GOP (0) 304A, GOP (1) 304B, through GOP (n) 304C, collectively GOPs 304. GOP (0) 304A includes I-frame 306A, B-frame 306B, B-frame 306C, P-frame 306D, through B-frame 306E. GOP (1) 304B includes I-frame 308A, B-frame 308B, B-frame 308C, P-frame 308D, through B-frame 308E. GOP (n) 304C includes I-frame 310A, B-frame 310B, B-frame 310C, P-frame 310D, through B-frame 310E. While the GOPs 304 are shown with a particular number and order of I-frames, B-frames, and P-frames, the GOPs 304 can include any number and/or order of frames subject to compliance of the video encoding specification used to encode the content stream. Similarly, the head and tail ends of the GOPs and frames are used to measure time and delays and to place pointers, but this is merely exemplary and the techniques described herein are not limited to such boundaries.

Read pointer (n) 312 points to the starting I-frame 306A of GOP (0) 304A. Read pointer (n−1) 314 points to the starting I-frame 308A of GOP (1) 304B. Read pointer (0) 316 points to the starting I-frame 310A of GOP (n) 304C. Write pointer 318 points to the end of the last written frame of buffer 102, B-frame 31 OE of GOP (n) 304C. Write pointer 318 indicates the beginning location of where the next received frames are to be buffered in buffer 302. The I-frame 306A of GOP (0) 304A is written to the buffer 302 at time $t_0$, time $t_0$ being the oldest time along the time (t) arrow 320. The B-frame 306E of GOP (0) 304A ends at $t_1$, and I-frame 308A of GOP (1) 304B begins at time $t_1$. The last B-frame 308E of GOP (1) 304B ends at time $t_2$. There can be any number of GOP frames between times $t_2$ and $t_{n-1}$, with the beginning I-frame of each of the GOPs pointed to by additional read pointers. The beginning I-frame 310A of GOP (n) 304C begins at time $t_{n-1}$, and the last B-frame 310E of GOP (n) 304C ends at time $t_n$.

The multiple GOP sequence (i.e., GOP (0) 304A through GOP (n) 304C) in buffer 302 can be from an SPTS, where the write pointer 318 is the current position with respect to the arriving SPTS. Each read pointer of buffer 302 has a delay from the most recent write time of the SPTS stream. Read pointers can be pointed at random access points within the buffer 302 that allow playback of video frames that can be properly decoded by a receiving device. Assuming time $t_n$ represents the most recent write time of the SPTS stream (e.g., the time at which the most recent frame is written into buffer 302, with frame 310E of GOP (n) 304C being the most recently written frame in buffer 302), read pointer (0) 316 is pointed at a frame with the delay 322 from the most recent write time $t_n$, read pointer (n−1) 314 is pointed at a frame with the delay 324 from the most recent write time $t_n$, and read pointer (n) 312 is pointed at a frame with the delay 326 from the most recent write time $t_n$. Each illustrated read pointer (i.e., read pointer (0) 316 through read pointer (n) 312) can be associated with a different subscriber and/or a different device (e.g., a subscriber's STB), where each subscriber and/or device has an associated delay from the most recent write time of the stream. The delay from the most recent write time for each device and its associated functionality is described in further detail with reference to FIG. 4.

The ingest module 104 can buffer each broadcast channel SPTS so that each SPTS has a corresponding buffer, resulting in a separate buffer for each broadcast channel. Since different broadcast channels can be broadcast at slightly different times, and their GOP size may be different, it is advantageous to have a means to randomly select a GOP starting position (e.g., the starting I-frame, such as I-frame 306A of GOP (0) 304A). The buffer 302 allows the random selection of GOP starting positions by providing simultaneous read access to the GOPs at a plurality of arbitrary locations, which enhances services that require synchronized events (e.g., fast channel change performance is enhanced by allowing the selection of a GOP at any position in the buffer).

The buffer 302 can be modeled as a circular memory with a write pointer (e.g., write pointer 318) and one or more read pointers (e.g., read pointers (0) 316 through (n) 312). Each read pointer is associated with a device of a subscriber sharing the program in the buffer 302. Multiple SPTS (each in a separate buffer 302) may share the same memory structure (e.g., DRAM). The number and bit rate of the ingested SPST channels (e.g., channels 0 through m) can be used to determine the write bandwidth.

Figure 4:
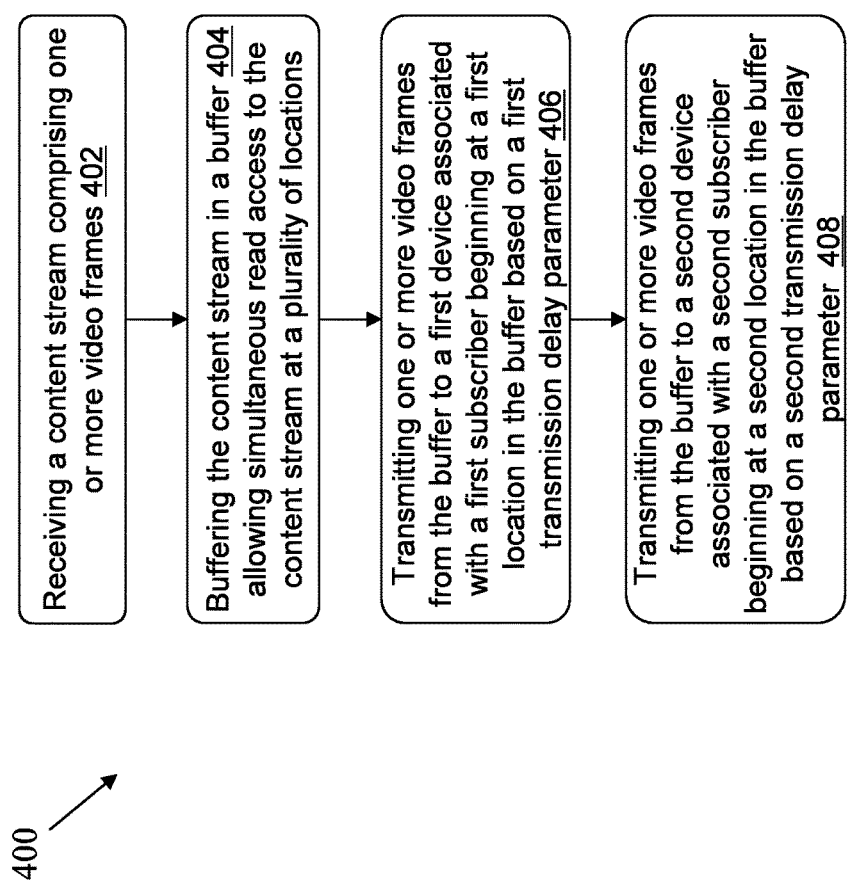
FIG. 4 is a flow chart illustrating an exemplary method for deterministically skewing synchronized events for a content stream.

FIG. 4 is a flow chart illustrating an exemplary method 400 for deterministically skewing synchronized events for a content stream. With reference to FIGS. 2 and 3, the method 400 includes the ingest module 104 receiving (402) the content stream 110 comprising one or more video frames. The ingest module 104 buffers (404) the content stream 110 in a buffer (e.g., buffer (0) 218A, which is an instance of the buffer 302) of the storage module 106, wherein the buffer allows simultaneous read access to the content stream 110 at a plurality of locations (e.g., the locations pointed to by read pointer (0) 316 through read pointer (n) 312). The delivery module 108 transmits (406) one or more video frames of the content stream 110 from the buffer in the storage module 106 to a first device associated with a first subscriber (e.g., device (0) 112A) beginning at a first location (e.g., the location pointed to by read pointer (n) 312 in the buffer 302, containing the first I-frame 306A of GOP (0) 304A) in the buffer based on a first transmission delay parameter (e.g., delay 326). The delivery module 108 transmits (408) one or more video frames of the content stream 110 from the buffer to a second device associated with a second subscriber (e.g., device (1) 112B) beginning at a second location (e.g., the location pointed to by read pointer (n−1) 314 in the buffer 302, containing the first I-frame 308A of GOP (1) 304B) in the buffer based on a second transmission delay parameter (e.g., delay 324).

With further respect to step 404, the length of the buffer (e.g., buffer 302) determines the amount of storage available in the buffer at any one time for an SPTS. Initially, the write and read pointers (e.g., read pointer (0) 316 through read pointer (n) 312, and write pointer 318) are at the same position in the buffer. When data is written (or buffered) to the buffer, the write pointer advances by the amount of data written. For example, if a GOP is written to the buffer, the write pointer advances by the number of frames written for the GOP. For example, referencing FIGS. 2 and 3, the ingest module 104 buffers a content stream 110 into an instance of buffer 302. The initial memory location pointed to by write pointer 318 is the memory location where I-frame 306A is located, although initially the memory location is empty. After buffering I-frame 306A in the buffer 302, the ingest module 104 advances the write pointer of the buffer 302 to point to the next memory location in the buffer, the location where B-frame 306B is located, although the location is initially empty prior to having data buffered to that location. In some examples, although it is possible to read from the buffer for delivery almost immediately following a write from the ingest module 104, certain applications (e.g., fast channel change) may require content in the buffer (e.g., one GOP). Ensuring there is content in the buffer can skew the delivery module 108 from the ingest module 104 at least by the length of the GOP (e.g., a one (1) second GOP would delay the delivery module 108 slightly more than 1 second from ingest in the ingest module 104).

With respect to steps 406 and 408, the length of the buffer can be made arbitrarily deep to support, for example, a large delay or a large amount of "replay" buffer (e.g., for applications that rewind back through live content broadcast). For example, for a memory system that can support multiple buffers, one buffer per SPTS, each stored SPTS has a write pointer, and each device accessing the memory has an associated read pointer, which may select any stored frames at any point in the SPTS. The length (or size) of the buffer 302 can be calculated based on any number of criteria. In some examples, the size of the buffer 302 is calculated based on a maximum transmission delay parameter. For example, the delivery module 108 positions each read pointer (e.g., read pointers (0) 316 through (n) 312) based on a transmission delay. Referencing FIG. 3, the delivery module 108 can position read pointer (0) 316 in buffer 302 at a valid starting location (e.g., the first I-frame 310A of GOP (n) 304C) so that delay 322 best approximates the transmission delay parameter associated with the receiving device/subscriber. By calculating the size of the buffer 302 to handle a maximum transmission delay parameter, all transmission delay parameters (which are used to calculate the initial location of the read pointers within buffer 302) are less than or equal to the maximum transmission delay parameter. For example, if the maximum transmission delay parameter is set to 20 seconds for buffer 302, then the buffer 302 will be configured with a size that can support the positioning of a read pointer with a delay of at most 20 seconds from the most recent write time of the content stream (e.g., the difference between $t_0$ and $t_n$ is approximately 20 seconds).

As an example, assume that a buffer of the storage module 106 is being used by the ingest module 104 to buffer content for a live content stream of a sporting event with a starting write time of 12:00:00 p.m. The buffer includes not only content of the beginning of the live content sporting stream, but also a portion of the pre-game show with a starting write time of 11:30:00 a.m. and an ending write time of 12:00:00 p.m. Devices 112 can simultaneously access content from the buffer based on their associated transmission delay parameter. For example, if a first device has a transmission delay parameter of ten (10) seconds, a request from the first device at the most recent write time of 12:00:00 p.m. causes the delivery module 108 to transmit content to the first device that is offset by approximately ten (10) seconds from the most recent write time. Thus, instead of transmitting content to the first device with the most recent write time of 12:00:00 p.m., the delivery module 108 transmits content for the live content channel that had a write time of 11:59:50 a.m. As such, the first device would receive ten (10) seconds of the pre-game show. Similarly, in response to a delivery request by a second device with a delay parameter of fifteen (15) seconds at the most recent write time of 12:00:00 p.m., the delivery module 108 transmits content to the second device for the live content channel that had a write time of 11:59:45 a.m. (or 15 seconds of the pregame show). In some examples, frame boundaries and the type of frames (e.g., an I-frame) dictate the precise location of read and write pointers and so timing will not be as exact as described. In such examples, regardless of the actual time of a request (e.g., whether the actual time corresponds to the most recent write time of the stream or not), each device receives content that is offset from the most recent write time by the transmission delay parameter associated with the device.

The maximum transmission delay parameter can be modified based on a number of read pointers associated with the buffer, a processing performance value, and/or the like. For example, the number of read pointers required to support devices requesting content from a buffer may exceed the number supported within the maximum transmission delay window (e.g., zero (0) through n, where n is the maximum transmission delay parameter). In some examples, a device requesting content from a buffer for the first time may have a transmission delay parameter that is greater than the current maximum transmission delay parameter, which would require changing the maximum transmission delay parameter of the buffer to compensate for the new transmission delay parameter (e.g., the transmission delay parameters should be less than or equal to the maximum transmission delay parameter). In some examples, because the size of the buffer is set to store enough content to support the maximum delay parameter, the size of the buffer is modified to support the modified maximum transmission delay parameter as that parameter is changed.

With respect to steps 406 and 408, when the delivery module 108 reads from the buffer for a device associated with a subscriber, the read pointer (e.g., read pointer (n) 312) for that device advances by the amount of data that is read. The read pointer is pointed at a location in the buffer based on the transmission delay parameter associated with the device. The read pointer can be pointed at a location in the buffer based on the transmission delay parameter and the index information (or index file) generated by the ingest module. One or more video frames of the content stream are transmitted from the buffer to the first device beginning with a video frame at the location pointed to by the read pointer. For example, if a device has a ten (10) second transmission delay parameter, the delivery module 108 references the index information to determine a valid starting time in the buffer that most closely approximates the ten (10) second transmission delay, and points the read pointer to the valid starting time.

If the distance between the write and read pointers reaches a length parameter (e.g., the limit of storage for this buffer) the read pointer can be configured to advance the same amount of data being written to avoid "wrapping the buffer." The delivery module 108 is responsible for scheduling the content read requests to the buffer, while the ingest module 104 performs the writes to the buffer. Writes per SPTS generally will occur at the rate that the ingest module 104 receives the content from the network, which, for live content broadcast, is typically the same rate as that produced by an encoder. Since different live content broadcast networks can uses different clocks, each SPTS may have slightly different timing. The delivery stream can be locked to the clock of the each arriving SPTS that the delivery stream delivers to avoid overflowing or underflowing the buffer.

Further, for steps 406 and 408, the number of devices (e.g., devices 112 of FIG. 2) accessing the memory within which the buffers are located (e.g., multiple instances of buffer 302) and the delivery rate can be used to determine the read bandwidth of the memory. In general, the width of the buffer (e.g., the number of bits accessed simultaneously in a given write or read cycle) can be made arbitrarily wide to support the bandwidth requirements.

In some examples, the first transmission delay parameter, and in some examples, the corresponding placement of the read pointer, can be associated with a plurality of devices associated with a subscriber. For example, referencing FIGS. 2 and 3, read pointer (0) 316 can correspond to all the STBs located in a subscriber's home receiving the same content stream. As a result, all content the delivery module 108 transmits to the subscriber (i.e., all content transmitted to any of the subscriber's STBs, regardless of the channel the STBs are tuned to) has the same predetermined delay, delay 322, from the most recent write time of a live content stream. For example, if delay 322 is 10 seconds, all content received by the subscriber has a ten (10) second delay from the most recent write time. If the subscriber begins watching a particular channel at the actual time of 12:00:00 p.m., the subscriber will receive the content for the channel to which the STB is tuned that had a write time of 11:59:50 a.m. due to the ten (10) second delay (e.g., approximately ten (10) seconds from the most recent write time of the stream). In some examples, a different transmission delay is associated with each device from a plurality of devices associated with the subscriber. For example, if a subscriber has two STBs, each STB has a different transmission delay (e.g., the first STB has a delay of 10 seconds from the most recent write time of a live content stream, while the second STB has a delay of 15 seconds from the most recent write time of a live content stream). As such, if both STBs are tuned to the same broadcast channel, each STB will receive the content at different delays from the most recent write time based on the delay associated with each STB (e.g., the first STB receives the content with a 10-second delay from the most recent write time, while the second STB receives the content with a 15-second delay from the most recent write time).

In some examples, the transmission delay parameters, or amount of delay from the most recent write time, (e.g., delay 322, 324, 326 of FIG. 3) to be added to a delivery SPTS are determined statically as a provisioning parameter (e.g., are set to or associated with a predetermined value). The provisioning parameters can be stored in a table and accessed when subscribers or devices first connect to the video delivery system. In some examples, the transmission delay parameter is chosen dynamically as subscribers connect. For example, the transmission delay parameters are dynamically determined using a random number within a range with a maximum value limit based on the length of the buffer. For example, if the length of a buffer in the storage module 106 is ten (10) seconds, the transmission delay parameters can be calculated based on a range of zero (0) to ten (10) seconds. The transmission delay parameters can be dynamically determined using a round-robin approach that adds a small predetermined incremental value to each device or subscriber that connects to the video delivery system. For example, if the predetermined incremental value is 0.25 seconds, the first device to connect to the system is assigned a transmission delay parameter of 0.25 seconds, the second device to connect to the system is assigned a transmission delay parameter of 0.50 seconds (which is equal to the previous device's transmission delay parameter plus the predetermined incremental value), and so on. In some examples, the transmission delay parameter is chosen dynamically based on current system loading. The transmission delay parameters, once calculated, can be maintained per device and/or subscriber in a table. Advantageously, by storing the transmission delay parameters, the parameters can be used whenever channel changing events occur, which is described in further detail below.

Figure 5:
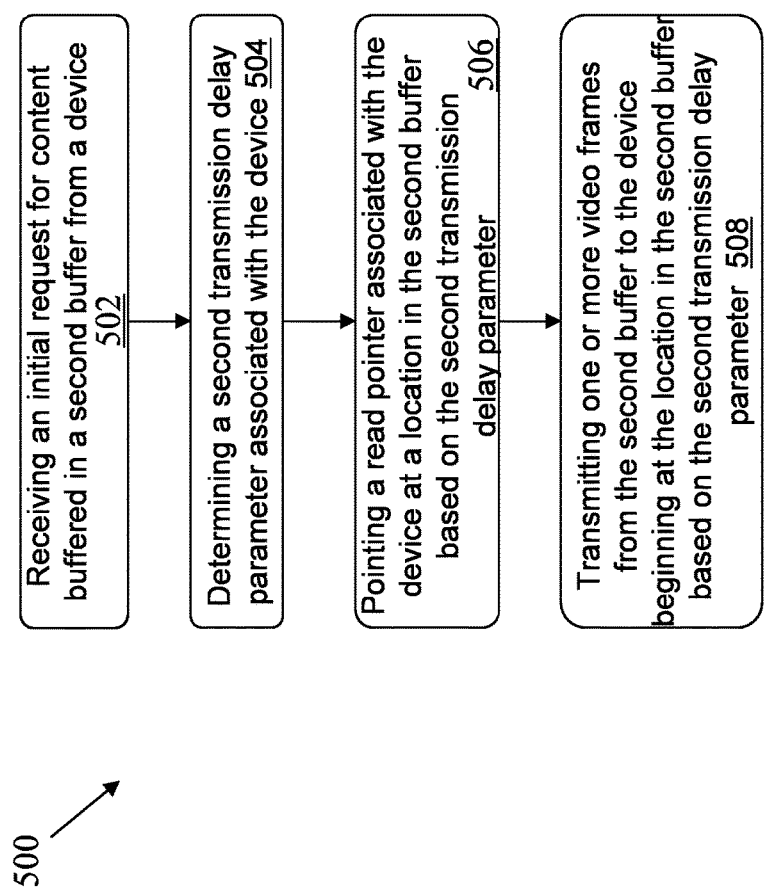
FIG. 5 is a flow chart illustrating an exemplary method for deterministically skewing synchronized events for a content stream request.

FIG. 5 is a flow chart illustrating an exemplary method 500 for deterministically skewing synchronized events for a content stream request when changing from a stream buffered in a first buffer to a stream buffered in a second buffer (e.g., when changing channels). With reference to FIGS. 2 and 3, the delivery module 108 receives (502) an initial content request from a device (e.g., device (0) 112A) for content buffered in a second buffer 302. The device transmits the request because the device is not yet receiving content from the second buffer (e.g., the device is receiving content from a first channel buffered in the first buffer). The delivery module 108 determines (504) a second transmission delay parameter associated with the device. The delivery module 108 points (506) a read pointer (e.g., read pointer (0) 316) associated with the device at a location in the second buffer 302 based on the second transmission delay parameter. The delivery module 108 transmits (508) one or more video frames of a content stream from the second buffer to the first device beginning with a video frame at the location pointed to by the read pointer. If, for example, the device was receiving content from a first location in a first buffer based on a first transmission delay parameter before sending the initial content request, the device receives content from the second buffer at a second location based on the second transmission delay parameter.

In some examples, the first transmission delay parameter is equal to the second transmission delay parameter. With respect to step 504, in some embodiments the transmission delay parameter for a device does not change (e.g., the same transmission delay is used regardless of the particular broadcast channel (or buffer) the device is requesting content from, the time of day, power-cycles of the hardware, etc.). In a sense, the device is treated as always having a delay from the most recent write time. For example, assume the most recent write time is 10:00:00 p.m. and the device requesting content has a transmission delay parameter of 10 seconds associated with the device. The device will receive content that is 10 seconds delayed from the most recent write time. For example, a request made at 10:00:00 p.m. actual time will receive content that had a write time of 9:59:50 p.m., being delayed by 10 seconds, rather than the content with the most recent write time of 10:00:00 p.m. Advantageously, by maintaining the transmission delay parameter for a device across multiple channels, the device can switch between channels (e.g., between buffers) and maintain the same delay so no live content is missed (e.g., regardless of channel surfing). In some examples, the transmission delay parameter associated with a device may be zero (0), and the device will receive content with no delay (e.g., the device will receive content with the most recent write time of 10:00:00 p.m.).

With respect to step 506, when a device requests content from a buffer for the first time (e.g., changing channels and switching between two buffers, powering on and tuning to a channel, etc.), the delivery module (e.g., delivery module 108 of FIG. 2) can choose a starting I-frame (e.g., I-frame 306A that is the start of GOP (0) 304A) in the buffer being switched to that has a position based on the transmission delay parameter of the device. For example, when changing from one buffer to a second buffer, the relative time delay from the most recent write time that the previously viewed stream used in the previous buffer can be carried over to the second buffer by preserving as best as possible the transmission delay parameter. Advantageously, preserving the transmission delay parameter allows all the channels viewed by a device/subscriber to be delayed by roughly the same amount from the most recent write time so that channel changes appear to happen coincident with time (even though delayed by some amount).

Further, with respect to step 506, setting a read pointer for a device within a buffer at a point that is not a valid starting point may result in increased channel changing delay, since the decoder will likely discard video frames that the decoder cannot decode up to the point that the decoder identifies as a valid starting point. For example, setting read pointer (n) 312 to the location of B-frame 306B of GOP (0) 304A is not a valid starting point, so all the remaining frames until I-frame 308A of GOP (1) 304B will be discarded.

A read pointer position in a buffer (e.g., buffer 302 of FIG. 3) can be computed based on the extent of the buffer (e.g., the data and the data layout within the buffer) and the current write pointer position, which is used to approximate the read pointer position (e.g., the read pointer can be computed as an offset to the write pointer). For example, referencing FIGS. 2 and 3, the ingest module 104 creates the index information for buffer 302, which contains a list of starting I-frames (e.g., I-frame 306A, 308A, and 310A) along with their memory address in the buffer 302 and their relative time of arrival (e.g., the time of arrival, or write time, of I-frame 306A is $t_0$). The read pointer can be determined by taking the transmission delay parameter (e.g., how much time to delay from the most recent write time), subtracting this from the approximate most recent write time (e.g., the write time at which the write pointer 318 is located, which is time $t_n$), searching for the nearest previous starting I-frame in the index file and in the buffer 302, that matches the resulting delay from the write pointer 318. For example, to position a read pointer for a device with a transmission delay parameter that is approximately half of delay 322, then subtracting the transmission delay parameter from write pointer 318 (or $t_n$), would put the read pointer at a location in the middle of GOP (n) 304C, and searching for the nearest previous starting I-frame (based on index information for the content in the buffer), the delivery module 108 would point the read pointer at the memory location occupied by I-frame 310A for GOP (n) 304C.

Because the initial position of the read pointer should be chosen in a buffer based on a valid starting or "in-point" in the video stream (e.g., an I-picture at start of GOP) and the amount of skew desired between subscribers (e.g., different transmission delay parameters so each subscriber or device receives video frames from the buffer at different times), some skewing of buffer read pointers may occur when subscribers (e.g., via a device) first request content from a particular buffer. When a subscriber changes channels (switching from one buffer to another buffer), the delivery module chooses a position in the buffer from which to begin reading that is nearest in relative time to the position of content from a previously accessed buffer, both of which are determined based on the associated transmission delay parameter. For example, if a subscriber is associated with a three (3) second transmission delay parameter, the subscriber is initially delayed from the most recent write time approximately three seconds at the beginning of a session in one buffer. The video delivery system receives a content request from the device, wherein the content associated with the content request is buffered in a different buffer than the buffer currently being used to transmit content to the device. When the subscriber changes to a second buffer, the starting location of the read pointer in the second buffer (with a different program) is selected based on the same three (3) second transmission delay parameter. After the read pointer is positioned at the starting location of the second buffer, the delivery module transmits one or more video frames of a content stream from the second buffer to the device, beginning with a video frame at the location pointed to by the read pointer. Advantageously, the same subscriber delay is maintained, and the same transmission delay parameter is maintained between different buffers for a subscriber, whether the subscribers are sharing the same buffer or accessing a separate buffer for other content.

Figure 6:
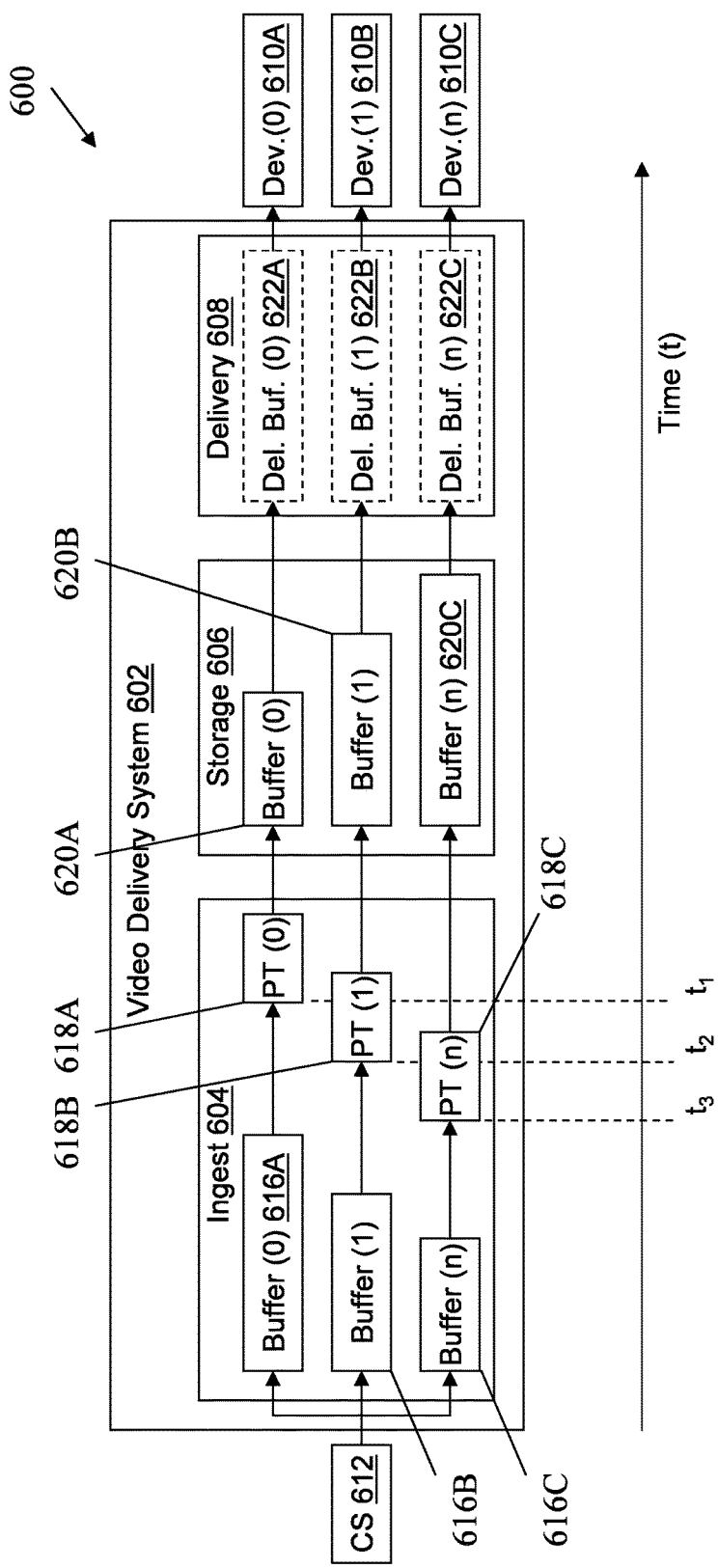
FIG. 6 is another exemplary diagram illustrating a video delivery system.

FIG. 6 is an exemplary diagram 600 illustrating a video delivery system 602, which includes ingest module 604, storage module 606, and delivery module 608. Ingest module 604 is in communication with the storage module 606. The storage module 606 is in communication with the delivery module 608. The delivery module 608 is in communication with one or more devices, device (0) 610A, device (1) 610B, through device (n) 610C, collectively devices 610, through a communication network.

The ingest module 604 receives content stream 612. The content stream 612 has one or more content processing locations (e.g., ad insertion locations). The ingest module 604 includes buffer (0) 616A, buffer (1) 616B, through buffer (n) 616C, collectively buffers 616. Each buffer is associated with a processing delay parameter (e.g., see FIG. 7). Processing time (0) 618A occurs at time $t_1$, processing time (1) 618B occurs at time $t_2$, and processing time (n) 618C occurs at time $t_3$. The storage module 606 includes the same number of buffers as the ingest module 604, namely buffer (0) 620A, buffer (1) 620B, through buffer (n) 620C, collectively buffers 620. Each of the buffers 616 in the ingest module 604 is in communication with a buffer from the buffers 620 of the storage module 606 (e.g., buffer (0) 616A is in communication with buffer (0) 620A, etc.). The buffers 620 can be optionally configured to have transmission delay parameters (see e.g., FIG. 3).

Delivery module 608 optionally includes one or more delivery buffers, delivery buffer (0) 622A, delivery buffer (1) 622B, through delivery buffer (n) 622C, collectively delivery buffers 622. Delivery buffer (0) 622A is in communication with device (0) 610A, delivery buffer (1) 622B is in communication with device (1) 610B, and delivery buffer (n) 622C is in communication with device (n) 610C. The optional delivery buffers 622 can decouple the delivery module 608 from the buffers 620 of storage module 606 (e.g., allow for variations in access latency of buffers 620 when multiple subscriber requests are made for content). Although each delivery buffer 622 corresponds to a respective device 610, such 1-to-1 correspondence is not necessary.

Figure 7:
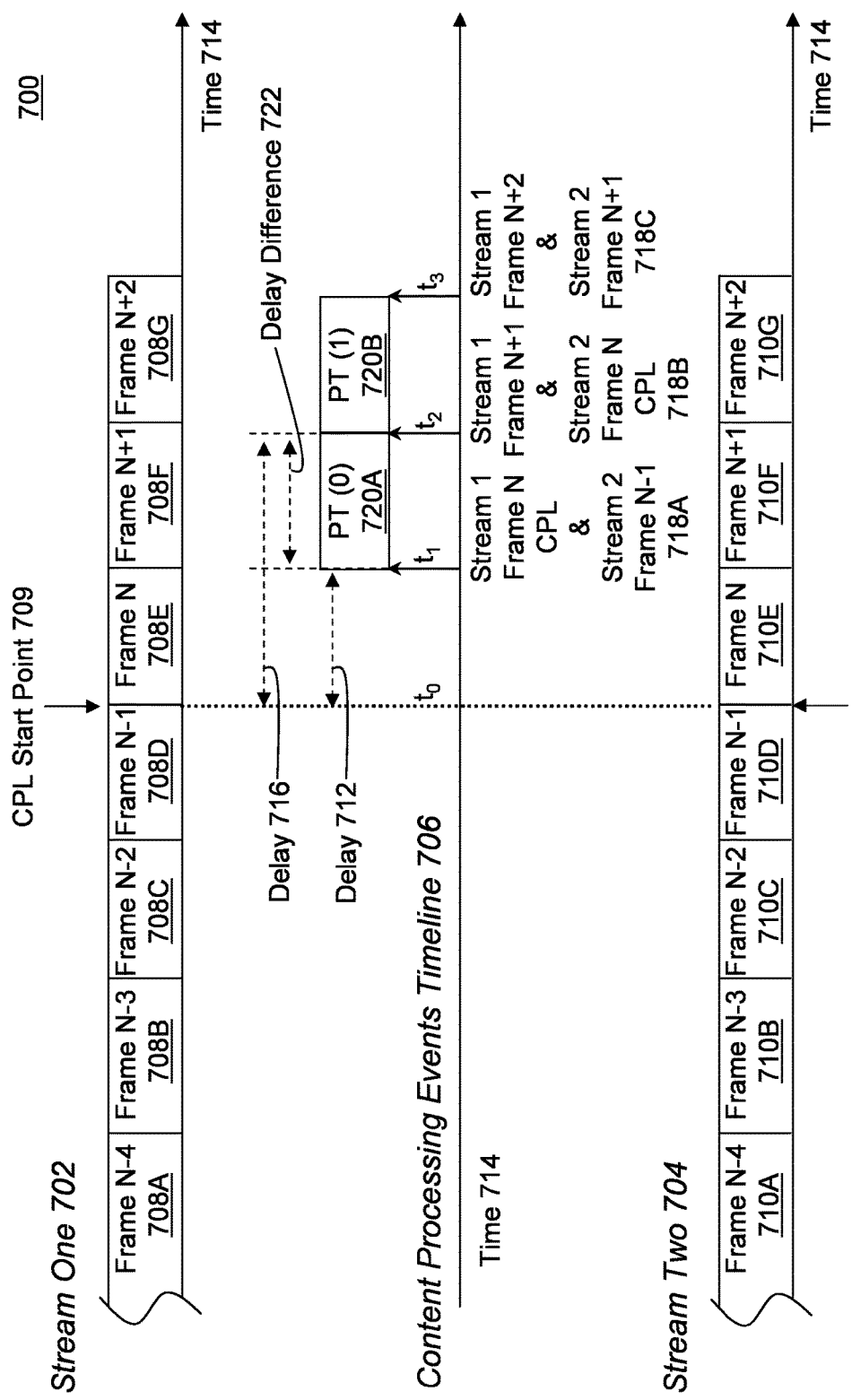
FIG. 7 is an exemplary diagram illustrating content processing.

FIG. 7 is an exemplary diagram 700 illustrating content processing associated with a video delivery system (e.g., the video delivery system 602 of FIG. 6). Diagram 700 includes stream one 702, stream two 704, and the content processing events timeline 706. Stream one 702 includes frame N−4 708A, frame N−3 708B, frame N−2 708C, frame N−1 708D, frame N 708E, frame N+1 708F, and frame N+2 708G. Content processing location (CPL) start point 709 begins between frame N−1 708D and frame N 708E. Stream two 704 includes frame N−4 710A, frame N−3 710B, frame N−2 710C, frame N−1 710D, frame N 710E, frame N+1 710F, and frame N+2 710G. CPL start point 711 begins between frame N−1 710D and frame N 710E.

Stream one 702 has a processing delay 712 as time 714 progresses. For example, although frame N 708E of stream one 702 can be processed at $t_0$, the ingest module 604 delays from $t_0$ to $t_1$ (i.e., delay 712) before processing frame N 708E of stream one 702 (and all the frames of stream one 702 are delayed by the same value of delay 712). The processing delay 712 is calculated based on a processing delay parameter associated with the buffer (e.g., buffer (n) 616C of FIG. 6) into which stream one 702 is buffered (e.g., by the ingest module 604). Stream two 704 has a processing delay 716 as time 714 progresses. For example, although frame N 710E of stream two 704 can be processed at $t_0$, the ingest module 604 delays from $t_0$ to $t_2$ (i.e., delay 716) before processing frame N 710E of stream two 704. The delay 716 is calculated based on a processing delay parameter associated with the buffer (e.g., buffer (1) 616B of FIG. 6) containing stream two 704. The CPL processing (e.g., at CPL start points 709, 711) can continue over one or more frames. For example, CPL processing can be ad insertion, which requires transrating and removing bits from frames.

With respect to the content processing events timeline 706, events 718A through 718C, collectively events 718, occur starting at various times ($t_1$-$t_3$). During event 718A starting at $t_1$, the ingest module 604 performs content processing on stream one 702 beginning with frame N 708E, and processes frame N−1 710D of stream two 704. For example, when content processing is ad insertion, content processing can be performed via an ad splicer within or in communication with the ingest module 604. Because the CPL start point 709 occurs between frame N−1 708D and frame N 708E of stream one 702, $t_1$ is the start of processing time (0) 720A. During event 718B starting at $t_2$, the ingest module 604 processes frame N+1 708F of stream one 702 and performs content processing on stream two 704 beginning with frame N 710E. Because the CPL start point 711 occurs between frame N−1 710D and frame N 710E of stream two 704, $t_2$ is the start of processing time (1) 720B. During event 718C starting at $t_3$, the ingest module 604 processes frame N+2 708G of stream one 702 and frame N+1 710F of stream two 704.

Processing events continue along the content processing events timeline 706 for any remaining frames of stream one 702 and/or stream two 704 (not shown). Stream one 702 and stream two 704 can be copies of the same content stream. Stream one 702 and stream two 704 have CPL start points (e.g., CPL start point 709 and 711, respectively) that would require content processing at approximately the same time absent using processing delay parameters to calculate delays 712 and 716, respectively. For example, if the ingest module 604 did not wait delay 712 and 716 for stream one 702 and stream two 704, respectively, frame N 708E and frame N 710E would both need to be processed at $t_0$. Because delay 716 is greater than delay 712 by the delay difference 722, the CPL start points 709, 711 of stream one 702 and stream two 704 are spread out in time 714. This advantageously removes a peak burden on the content processor, e.g., an ad splicer, and instead spreads the demand for resources over time. While FIG. 7 only shows two streams (i.e., stream one 702 and stream two 704), content processing, and the delay techniques described herein, can occur on any number of streams with any number of frames and at any location within the streams (e.g., at the beginning, middle, or some other portion of the stream).

Figure 8:
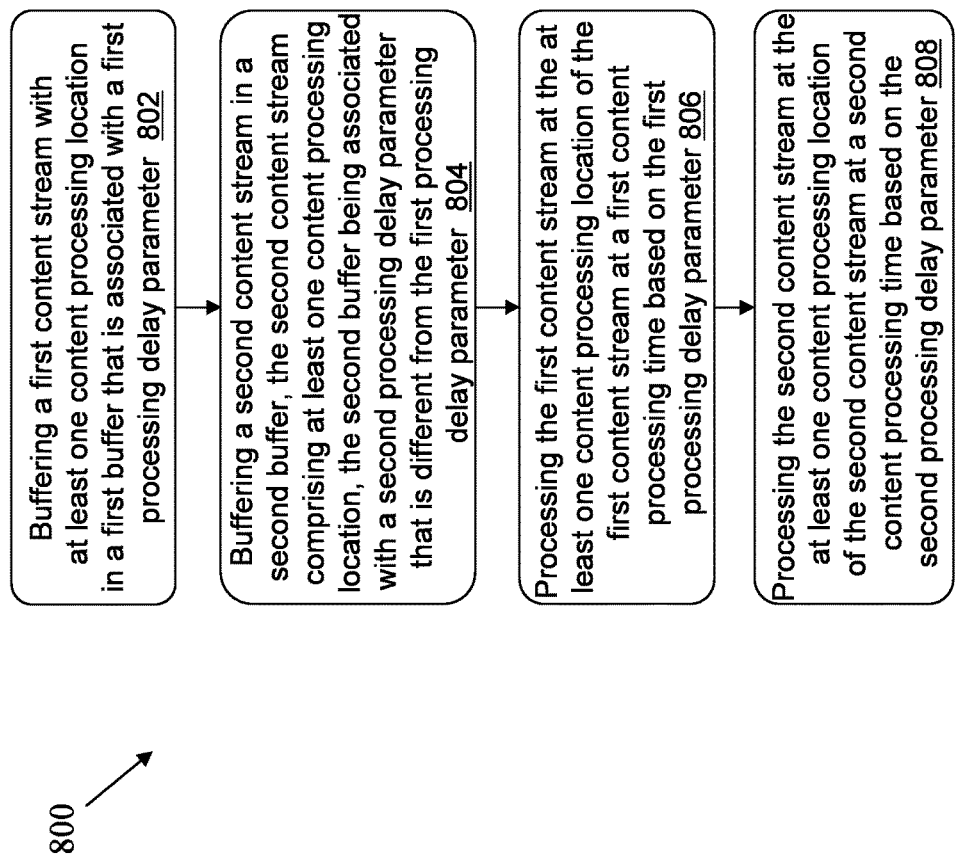
FIG. 8 is a flow chart illustrating an exemplary method for deterministically skewing synchronized events for a content stream.

FIG. 8 is a flow chart illustrating an exemplary method 800 for deterministically skewing synchronized events for a content stream. Referencing FIGS. 6 and 7, the ingest module 604 buffers (802) a first content stream (e.g., stream one 702) comprising at least one content processing location (e.g., CPL start point 709) in a first buffer (e.g., buffer (0) 616A), wherein the first buffer is associated with a first processing delay parameter. The ingest module 604 buffers (804) a second content stream (e.g., stream two 704) in a second buffer (e.g., buffer (1) 616B), wherein the second content stream includes at least one content processing location (e.g., CPL start point 711), and the second buffer is associated with a second processing delay parameter that is different from the first processing delay parameter. The ingest module 604 processes (806) the first content stream at the at least one content processing location of the first content stream at a first content processing time (e.g., processing time (0) 720A, where content processing is performed on stream one 702 during event 718A starting at $t_1$) based on the first processing delay parameter (e.g., using the first processing delay parameter to calculate the delay 712). The ingest module 604 processes (808) the second content stream at the at least one content processing location of the second content stream at a second content processing time (e.g., processing time (1) 720B, where content processing is performed on stream two 704 during event 718B starting at $t_2$) based on the second processing delay parameter (e.g., using the second processing delay parameter to calculate the delay 716).

With respect to steps 802 and 804, the first and second content streams can be MPEG-2 transport streams, Adobe RTMP-based streams, interleaved RTSP-based streams, and/or the like. The first content stream and the second content stream can have the same delivery time. For example, if the first stream and the second stream are copies of a live content stream starting at 9:00:00 p.m., then the content streams should be processed and delivered at the same actual time. The delivery times of the content processing locations of the streams are equal. By using the processing delay parameters to delay (or skew) the processing times on ingest in time (e.g., content processing starting times $t_1$ and $t_2$ for events 718A and 718B, respectively), the burden on the control plane of the ingest module 604 and any associated storage required for the content processing (e.g., advertisement storage) can be reduced. Content processing can be performed not only on SPTS copies but also on separately arriving SPTS content.

Content processing can include, for example, performing ad insertions, graphical overlays, transrating, transformations, and other processing performed on ingested streams. For example, the video delivery system 602 can be used to perform ad splicing on live content ingested streams. A single SPTS is copied (e.g., one copy per buffer 616) and different ads are spliced into each copy at different processing times (e.g., processing times (0) 618A, (1) 618B, and (n) 618C starting at times $t_1$, $t_2$, and $t_3$, respectively). The input copy buffers can be made different lengths (e.g., resulting in different processing delay parameters since a shorter buffer will require content processing to be performed sooner than a longer buffer) for each copy to reduce the instantaneous burden on the splicing system (e.g., part of the ingest module 604) and the storage system that is reading the advertisements to be spliced.

With further respect to steps 806 and 808, once the content processing is performed, the content may be stored. For example, the ingest module 604 can buffer a first content stream (e.g., stream one 702) and a second content stream (e.g., stream two 704) in separate buffers in the storage module 606 (e.g., buffers 620). If the video delivery system 602 requires each copy to be delivered at the same time, the buffers 620 in the storage module 606 can be used to compensate for the delays used to skew the content processing times of the streams (e.g., delay 712 and delay 716). Advantageously, by re-adjusting the streams (or "de-skewing" the streams) the timing relationship between copies can be preserved for each subscriber, independent of which copy they are receiving (e.g., when a subscriber changes channels, then ads end at the same time, programs begin at the same time, etc.).

For example, to re-adjust the streams, the storage module 606 buffers 620 can each be associated with a transmission delay parameter. For example, the ingest module 604 buffers the first content stream in buffer (0) 620A, which has a first transmission delay parameter, and buffers the second content stream in buffer (1) 620B, which has a second transmission delay parameter. The delivery module 608 transmits one or more video frames from buffer (0) 620A to a device associated with a subscriber (e.g., in response to a request for content, a channel change, etc.) based on the first transmission delay parameter. The delivery module 608 transmits one or more video frames from buffer (1) 620B to a different device (e.g., associated with a different subscriber) based on the second transmission delay parameter. By transmitting content from the buffers based on the transmission delay parameters, the initial delays can be offset (e.g., the first transmission delay parameter associated with buffer (0) 620A offsets the first processing delay parameter associated with buffer (0) 616A and the second transmission delay parameter associated with buffer (1) 620B offsets the second processing delay parameter associated withy buffer (1) 616B. The buffers 620 of storage module 606 can allow simultaneous read access to the one or more video frames at a plurality of locations as described above with reference to FIGS. 1-5. Advantageously, content processing can be spread out over time to facilitate processing of streams with content processing locations that would require content processing of the streams at the same time.

Figure 9:
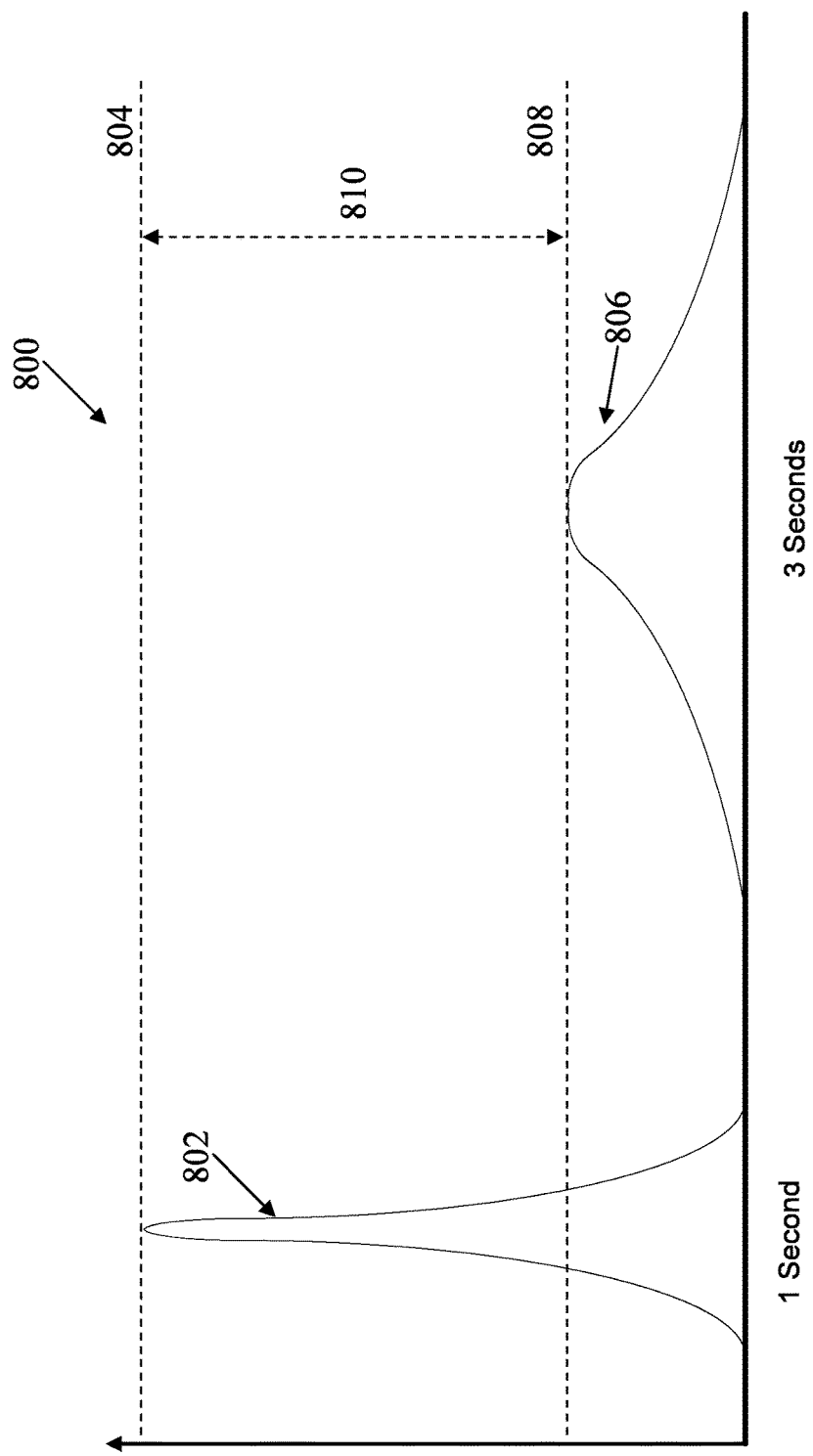
FIG. 9 is an exemplary diagram illustrating deterministically skewed synchronized events for a content stream.

FIG. 9 is an exemplary diagram 900 illustrating deterministically skewed synchronized events for a content stream. Diagram 900 includes curve 802 indicating the number of signaling events or processing events for a particular event (e.g., a channel change, a rewind request, an ad insertion, etc.) when the content streams are not deterministically skewed. The events are received over a very small period of time, one second in this exemplary diagram, causing a simultaneous number of requests reaching a peak 804. Curve 806 indicates the number of signaling events or processing events for a particular event when the content streams are deterministically skewed. Because the events are spread out over a larger period of time, the simultaneous number of requests are smoothed, just reaching peak 808. The difference 810 between the two peaks 804 and 808 shows the reduction of burden on the system (e.g., on the control plane, storage, etc.).

The systems and methods described herein can be used with land-based transmission, such as in cable and telco deployments. The timeshift TV rewind problem with respect to storage can also be addressed by maintaining a large live content broadcast buffer in fast access memory (e.g., DRAM), such that several seconds to several minutes of content (e.g., for a user-initiated content rewind) delivery can be satisfied from a very fast access storage medium. By making some or all of the rewind operations occur in fast memory, rather than from a possibly slower or higher latency storage element (e.g., HDD, flash memory, etc.), the burden on a slower access storage system can be reduced.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client (or subscriber) computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method comprising:
receiving, by a video delivery system, a content stream comprising one or more video frames;
buffering, by the video delivery system, the content stream in a buffer, wherein the buffer allows simultaneous read access to the content stream at a plurality of locations;
receiving, by the video delivery system, a first request for the content stream from a first device and a second request for the content stream from a second device;
determining, by the video delivery system, a first transmission delay parameter to use for the first device based on a first internal system value;
determining, by the video delivery system, a second transmission delay parameter to use for the second device based on a second internal system value;
associating, by the video delivery system, the first transmission delay parameter with the first device and the second transmission delay parameter with the second device, so as to stagger transmission of the content stream to the first device and the second device;
transmitting, by the video delivery system, one or more video frames of the content stream from the buffer to the first device associated with a first subscriber beginning at a first location in the buffer based on the first transmission delay parameter; and
transmitting, by the video delivery system, one or more video frames of the content stream from the buffer to the second device associated with a second subscriber beginning at a second location in the buffer based on the second transmission delay parameter;
wherein the video delivery system determines the first transmission delay parameter and associates the first transmission delay parameter with the first device at any of: a time that the first device connects to the video delivery system, and a time that the first subscriber connects to the video delivery system;
wherein the first internal system value, which the video delivery system uses to determine the first transmission delivery parameter, is one or more of: (i) a predetermined first provisioning parameter stored in a table for at least one of the first device and the first subscriber, the first provisioning parameter accessed when at least one of the first subscriber and the first device connects to the video delivery system, (ii) a first random number within a range having a maximum value limit based on a length of the buffer, (iii) calculated by adding an incremental value to a transmission delay parameter determined before the first device connects and based on a sequence in which devices connect to the video delivery system, and (iv) based on current system loading, where current means any of: at the time of the first device's connection to the video delivery system, and the time of the first subscriber's connection to the video delivery system;
wherein the video delivery system determines the second transmission delay parameter and associates the second transmission delay parameter with the second device at any of: a time that the second device connects to the video delivery system, and a time that the second subscriber connects to the video delivery system;
wherein the second internal system value, which the video delivery system uses to determine the second transmission delivery parameter, is one or more of: (i) a predetermined second provisioning parameter stored in a table for at least one of the second device and the second subscriber, the second provisioning parameter accessed when at least one of the second subscriber and the second device connects to the video delivery system, (ii) a second random number within the range having the maximum value limit based on the length of the buffer, (iii) calculated by adding the incremental value to a transmission delay parameter determined before the second device connects and based on the sequence in which devices connect to the video delivery system, and (iv) based on current system loading, where current means any of: at the time of the second device's connection to the video delivery system, and the time of the second subscriber's connection to the video delivery system.

2. The method of claim 1, further comprising using the first transmission delay for a plurality of devices associated with the first subscriber.

3. The method of claim 1, further comprising using a different transmission delay for each device from a plurality of devices associated with the first subscriber.

4. The method of claim 1, wherein transmitting one or more video frames of the content stream from the buffer to the first device comprises:
pointing a read pointer associated with the first device at a location in the buffer based on the first transmission delay parameter; and
transmitting one or more video frames of the content stream from the buffer to the first device beginning with a video frame at the location pointed to by the read pointer.

5. The method of claim 1, wherein:
buffering comprises generating index information for the content stream, the index information comprising location data for the one or more video frames in the buffer; and
wherein transmitting one or more video frames of the content stream from the buffer to the first device comprises:
pointing a read pointer associated with the first device at a location in the buffer based on the first transmission delay parameter and the index information; and
transmitting one or more video frames of the content stream from the buffer to the first device beginning with a video frame at the location pointed to by the read pointer.

6. The method of claim 1, wherein transmitting one or more video frames of the content stream from the buffer to the second device comprises:
pointing a read pointer associated with the second device at a location in the buffer based on the second transmission delay parameter; and
transmitting one or more video frames of the content stream from the buffer to the second device beginning with a video frame at the location pointed to by the read pointer.

7. The method of claim 1, further comprising:
receiving, by the video delivery system, a content request from the first device, wherein the content associated with the content request is buffered in a second buffer; and
maintaining, by the video delivery system, the first transmission delay parameter for the first device with the second buffer.

8. The method of claim 7, wherein maintaining comprises:
pointing a read pointer associated with the first device at a location in the second buffer based on the first transmission delay parameter; and
transmitting one or more video frames of a content stream from the second buffer to the first device beginning with a video frame at the location pointed to by the read pointer.

9. The method of claim 1, wherein the content stream is a live broadcast.

10. The method of claim 1, wherein the first location and the second location comprise a random access point.

11. The method of claim 1, wherein buffering comprises:
buffering a first frame of the one or more video frames of the content stream in the buffer; and
advancing a write pointer of the buffer to a next location in the buffer.

12. The method of claim 1, wherein transmitting one or more video frames of the content stream from the buffer to the first device comprises:
transmitting a video frame beginning at the first location from the buffer to the first device, the first location pointed to by a read pointer associated with the first device; and
advancing the read pointer to a next location in the buffer.

13. The method of claim 1, further comprising determining, by the video delivery system, a size of the buffer based on a maximum transmission delay parameter, wherein the first transmission delay parameter and the second transmission delay parameter are less than or equal to the maximum transmission delay parameter.

14. The method of claim 13, further comprising modifying the maximum transmission delay parameter based on a number of read pointers associated with the buffer, a processing performance value, or any combination thereof.

15. The method of claim 14, further comprising modifying the size of the buffer based on the modified maximum transmission delay parameter.

16. The method of claim 1, wherein the content stream is a MPEG-2 transport stream, an Adobe RTMP-based stream, an interleaved RTSP-based stream, or any combination thereof.

17. The method of claim 1, wherein the first internal system value is a predetermined provisioning parameter stored in a table for at least one of the first device or the first subscriber, the provisioning parameter accessed when at least one of a subscriber or a device connects to the video delivery system.

18. The method of claim 1, wherein the first internal system value is a random number within a range having a maximum value limit based on the length of the buffer.

19. The method of claim 1, wherein the first internal system value is calculated by adding an incremental value to a previously determined transmission delay parameter and based on the sequence in which devices connect to the video delivery system.

20. The method of claim 1, further comprising performing content processing of the content stream, wherein content processing comprises performing ad insertions, graphical overlays, transrating, transformations, or any combination thereof.

21. A system comprising:
one or more microprocessors and one or more storage devices holding first and second computer program instructions for execution on at least one of the one or more microprocessors;
an ingest module comprising the first computer program instructions for receiving a content stream comprising one or more video frames;
a buffer in communication with the ingest module configured to buffer the content stream, wherein the buffer allows simultaneous read access to the buffered content stream at a plurality of locations; and
a delivery module in communication with the buffer, the delivery module comprising the second machine-readable instructions for:
receiving a first request for the content stream from a first device and a second request for the content stream from a second device;

determining a first transmission delay parameter to use for the first device based on a first internal system value;

determining a second transmission delay parameter to use for the second device based on a second internal system value;

associate the first transmission delay parameter with the first device and the second transmission delay parameter with the second device, so as to stagger transmission of the content stream to the first device and the second device;

transmit one or more video frames of the content stream from the buffer to the first device associated with a first subscriber beginning at a first location in the buffer based on the first transmission delay parameter; and transmit one or more video frames of the content stream from the buffer to the second device associated with a second subscriber beginning at a second location in the buffer based on the second transmission delay parameter;

wherein the determining of the first transmission delay parameter and associating of the first transmission delay parameter with the first device at any of: a time that the first device connects to the system, and a time that the first subscriber connects to the system;

wherein the first internal system value, which the system uses to determine the first transmission delivery parameter, is one or more of: (i) a predetermined first provisioning parameter stored in a table for at least one of the first device and the first subscriber, the first provisioning parameter accessed when at least one of the first subscriber and the first device connects to the system, (ii) a first random number within a range having a maximum value limit based on a length of the buffer, (iii) calculated by adding an incremental value to a transmission delay parameter determined before the first device connects and based on a sequence in which devices connect to the system, and (iv) based on current system loading, where current means any of: at the time of the first device's connection to the system, and the time of the first subscriber's connection to the system;

wherein the determining of the second transmission delay parameter and associating of the second transmission delay parameter with the second device at any of: a time that the second device connects to the system, and a time that the second subscriber connects to the system;

wherein the second internal system value, which the system uses to determine the second transmission delivery parameter, is one or more of: (i) a predetermined second provisioning parameter stored in a table for at least one of the second device and the second subscriber, the second provisioning parameter accessed when at least one of the second subscriber and the second device connects to the system, (ii) a second random number within the range having the maximum value limit based on the length of the buffer, (iii) calculated by adding the incremental value to a transmission delay parameter determined before the second device connects and based on the sequence in which devices connect to the system, and (iv) based on current system loading, where current means any of: at the time of the second device's connection to the system, and the time of the second subscriber's connection to the system.

22. A computer program product, tangibly embodied in a computer readable non-transitory storage medium, the computer program product including instructions being operable to cause a data processing apparatus to:

receive a content stream comprising one or more video frames;

buffer the content stream in a buffer, wherein the buffer allows simultaneous read access to the content stream at a plurality of locations;

receive a first request for the content stream from a first device and a second request for the content stream from a second device;

determine a first transmission delay parameter to use for the first device based on a first internal system value;

determine a second transmission delay parameter to use for the second device based on a second internal system value;

associate the first transmission delay parameter with the first device and the second transmission delay parameter with the second device, so as to stagger transmission of the content stream to the first device and the second device;

transmit one or more video frames of the content stream from the buffer to the first device associated with a first subscriber beginning at a first location in the buffer based on the first transmission delay parameter; and transmit one or more video frames of the content stream from the buffer to the second device associated with a second subscriber beginning at a second location in the buffer based on the second transmission delay parameter;

wherein the data processing apparatus determines the first transmission delay parameter and associates the first transmission delay parameter with the first device at any of: a time that the first device connects to the data processing apparatus, and a time that the first subscriber connects to the data processing apparatus;

wherein the first internal system value, which the data processing apparatus uses to determine the first transmission delivery parameter, is one or more of: (i) a predetermined first provisioning parameter stored in a table for at least one of the first device and the first subscriber, the first provisioning parameter accessed when at least one of the first subscriber and the first device connects to the data processing apparatus, (ii) a first random number within a range having a maximum value limit based on a length of the buffer, (iii) calculated by adding an incremental value to a transmission delay parameter determined before the first device connects and based on a sequence in which devices connect to the data processing apparatus, and (iv) based on current system loading, where current means any of: at the time of the first device's connection to the data processing apparatus, and the time of the first subscriber's connection to the data processing apparatus;

wherein the data processing apparatus determines the second transmission delay parameter and associates the second transmission delay parameter with the second device at any of: a time that the second device connects to the data processing apparatus, and a time that the second subscriber connects to the data processing apparatus;

wherein the second internal system value, which the data processing apparatus uses to determine the second transmission delivery parameter, is one or more of: (i) a predetermined second provisioning parameter stored in a table for at least one of the second device and the second subscriber, the second provisioning parameter accessed when at least one of the second subscriber and the second device connects to the data processing apparatus, (ii) a second random number within the range having the maximum value limit based on the length of the buffer, (iii) calculated by adding the incremental value to a transmission delay parameter determined before the second device connects and based on the sequence in which devices connect to the data processing apparatus, and (iv) based on current system loading, where current means any of: at the time of the second device's connection to the data processing apparatus, and the time of the second subscriber's connection to the data processing apparatus.

23. A system comprising:
means for receiving a content stream comprising one or more video frames;
means for buffering the content stream, wherein the buffering means allows simultaneous read access to the buffered content stream at a plurality of locations; and
means for:
  receiving a first request for the content stream from a first device and a second request for the content stream from a second device;
  determining a first transmission delay parameter to use for the first device based on a first internal system value;
  determining a second transmission delay parameter to use for the second device based on a second internal system value;
  associating the first transmission delay parameter with the first device and the second transmission delay parameter with the second device, so as to stagger transmission of the content stream to the first device and the second device;
  transmitting one or more video frames of the content stream from the buffering means to the first device associated with a first subscriber beginning at a first location of the buffering means based on the first transmission delay parameter; and
  transmitting one or more video frames of the content stream from the buffering means to the second device associated with a second subscriber beginning at a second location of the buffering means based on the second transmission delay parameter;
wherein the determining of the first transmission delay parameter and associating of the first transmission delay parameter with the first device at any of: a time that the first device connects to the system, and a time that the first subscriber connects to the system;
wherein the first internal system value, which the system uses to determine the first transmission delivery parameter, is one or more of: (i) a first predetermined provisioning parameter stored in a table for at least one of the first device and the first subscriber, the first provisioning parameter accessed when at least one of the first subscriber and the first device connects to the system, (ii) a first random number within a range having a maximum value limit based on a length of the buffer, (iii) calculated by adding an incremental value to a transmission delay parameter determined before the first device connects and based on a sequence in which devices connect to the system, and (iv) based on current system loading, where current means any of: at the time of the first device's connection to the system, and the time of the first subscriber's connection to the system;
wherein the determining of the second transmission delay parameter and associating of the second transmission delay parameter with the second device at any of: a time that the second device connects to the system, and a time that the second subscriber connects to the system;
wherein the second internal system value, which the system uses to determine the second transmission delivery parameter, is one or more of: (i) a predetermined second provisioning parameter stored in a table for at least one of the second device and the second subscriber, the second provisioning parameter accessed when at least one of the second subscriber and the second device connects to the system, (ii) a second random number within the range having the maximum value limit based on the length of the buffer, (iii) calculated by adding the incremental value to a transmission delay parameter determined before the second device connects and based on the sequence in which devices connect to the system, and (iv) based on current system loading, where current means any of: at the time of the second device's connection to the system, and the time of the second subscriber's connection to the system.

24. The method of claim 1, wherein:
using comprises using the first transmission delay parameter for transmitting to the first device and the second transmission delay parameter for transmitting to the second device, so as to stagger transmission of unicast delivery of the content stream to the first device and the second device;
transmitting the one or more video frames of the content stream to the first device comprises transmitting the one or more video frames in a first unicast stream to the first device based on the first transmission delay parameter; and
transmitting the one or more video frames of the content stream to the second device comprises transmitting the one or more video frames in a second unicast stream to the second device based on the second transmission delay parameter.

25. The method of claim 1, wherein the first internal system value is based on current loading of the video delivery system.

26. The method of claim 1, wherein the first request is associated with the content stream at a particular write time of the buffer, and the second request is associated with the content stream at the same particular write time of the buffer, but due to the transmitting step to the first client device being based on the first transmission delay parameter, and the transmitting step to the second client device being based on the second transmission delay parameter, the video delivery system transmits the content stream to the first client device at a different write time than the write time at which the video delivery system transmits the content stream to the second device.

27. The method of claim 1, wherein the first transmission delay parameter corresponds to an amount of delay from a most recent write time of the content stream in the buffer.

* * * * *